United States Patent
Woodcock et al.

(10) Patent No.: US 6,213,745 B1
(45) Date of Patent: Apr. 10, 2001

(54) HIGH-PRESSURE, SELF-LUBRICATING JOURNAL BEARINGS

(75) Inventors: Glenn Woodcock, Conover; Billy R. Whisnant; Kevin S. Tuttle, both of Granite Falls, all of NC (US)

(73) Assignee: Dynisco, Sharon, MA (US)

( * ) Notice: Subject to any disclaimer, the term of this patent is extended or adjusted under 35 U.S.C. 154(b) by 0 days.

(21) Appl. No.: 09/304,504

(22) Filed: May 3, 1999

(51) Int. Cl.$^7$ ........................................ F03C 2/00
(52) U.S. Cl. .................. 418/206.7; 418/102; 418/206.8; 418/1; 384/291; 384/292
(58) Field of Search ................ 418/102, 206.7, 418/206.8, 1; 384/291, 292

(56) References Cited

U.S. PATENT DOCUMENTS

| | | | |
|---|---|---|---|
| 2,276,107 | * | 3/1942 | Simons ............................. 418/102 |
| 2,471,149 | * | 5/1949 | Girz ................................... 418/102 |
| 2,756,684 | * | 7/1956 | Renzo ................................ 418/102 |
| 2,816,511 | * | 12/1957 | Korkowski et al. .............. 418/102 |
| 2,853,952 | * | 9/1958 | Aspelin ............................. 418/102 |
| 3,447,472 | * | 6/1969 | Hodges et al. ................... 418/102 |
| 3,482,524 | * | 12/1969 | Marietta ............................ 418/102 |
| 3,975,026 | | 8/1976 | Boyle et al. . |
| 3,976,405 | | 8/1976 | Geiger et al. . |
| 4,090,820 | | 5/1978 | Teruyama . |
| 4,160,630 | | 7/1979 | Wynn . |
| 4,222,705 | | 9/1980 | Smith . |
| 4,240,000 | | 12/1980 | Harano et al. . |
| 4,265,602 | | 5/1981 | Teruyama . |
| 4,293,291 | | 10/1981 | Link . |
| 4,336,213 | * | 6/1982 | Fox ................................... 418/102 |
| 4,392,798 | | 7/1983 | Bowden . |
| 4,395,207 | | 7/1983 | Manttari et al. . |
| 4,420,291 | | 12/1983 | Winstead . |
| 4,470,776 | | 9/1984 | Kostek et al. . |
| 4,471,963 | | 9/1984 | Airhart . |
| 4,515,512 | | 5/1985 | Hertell et al. . |
| 4,573,889 | | 3/1986 | Lane . |
| 4,575,100 | | 3/1986 | Hay, II et al. . |
| 4,629,405 | | 12/1986 | Hidasi et al. . |
| 4,642,040 | | 2/1987 | Fox . |
| 4,645,418 | | 2/1987 | Siegel . |
| 4,648,816 | | 3/1987 | Sauter . |
| 4,682,938 | | 7/1987 | Riordan . |

(List continued on next page.)

FOREIGN PATENT DOCUMENTS 4-325785 * 11/1992 (JP) ....................................... 418/102

OTHER PUBLICATIONS

Naffah et al., "Gear Pump Bearing Design for Improved Plastics Processing," Paper #469, Maag Pump Systems Textron AG (Zurich, Switzerland),.

Primary Examiner—Thomas Denion
Assistant Examiner—Theresa Trieu
(74) Attorney, Agent, or Firm—Jenkins & Wilson, P.A.

(57) ABSTRACT

A journal bearing comprises a body having a central longitudinal axis, a cylindrical inner surface coaxially disposed around the longitudinal axis and defining an axial bore, and an outer surface including a peripheral planar section. A lateral face is disposed on an end of the body, and extends between the outer and inner surfaces of the body. A feed channel is formed in the lateral face at an acute angle with respect to the planar section and in an inward direction with respect to the axial bore. A first end of the feed channel communicates with the outer surface of the bearing at a location proximate to the planar section, and a second end of the feed channel communicates with the axial bore. A pocket is formed in the inner surface of the bearing in communication with the second end of the feed channel and extends along a substantially helical path from the lateral face of the bearing. At least a portion of the pocket has a width of greater magnitude than a corresponding depth of the portion.

40 Claims, 17 Drawing Sheets

U.S. PATENT DOCUMENTS

| | | |
|---|---|---|
| 4,699,575 | 10/1987 | Geisel et al. . |
| 4,716,494 | 12/1987 | Bright et al. . |
| 4,725,211 | 2/1988 | Gray . |
| 4,737,087 | 4/1988 | Hertell . |
| 4,813,863 | 3/1989 | Hahn et al. . |
| 4,859,161 | 8/1989 | Teruyama et al. . |
| 4,927,343 | 5/1990 | Lonsberry . |
| 5,051,071 | 9/1991 | Haentjens . |
| 5,119,886 | 6/1992 | Fletcher et al. . |
| 5,145,341 | 9/1992 | Drane . |
| 5,220,978 | 6/1993 | McMaster . |
| 5,224,838 | 7/1993 | Baumgarten . |
| 5,253,988 | 10/1993 | Hunziker et al. . |
| 5,322,421 | 6/1994 | Hansen . |
| 5,324,183 | 6/1994 | Capelle . |
| 5,394,040 | 2/1995 | Khanh . |
| 5,417,556 | 5/1995 | Waddelton . |
| 5,462,240 | 10/1995 | Stehr et al. . |
| 5,468,131 | 11/1995 | Blume et al. . |
| 5,494,425 | 2/1996 | Stehr . |
| 5,547,356 | 8/1996 | Stehr et al. . |
| 5,549,462 | 8/1996 | Mischler et al. . |
| 5,569,429 | 10/1996 | Luker . |
| 5,629,573 | 5/1997 | Ponnappan et al. . |
| 5,641,281 * | 6/1997 | Russell et al. .................... 418/206.7 |
| 5,702,234 | 12/1997 | Pieters . |
| 5,772,417 | 6/1998 | Stehr et al. . |
| 5,791,125 | 8/1998 | Kallner . |
| 5,913,608 | 6/1999 | Blume . |

\* cited by examiner

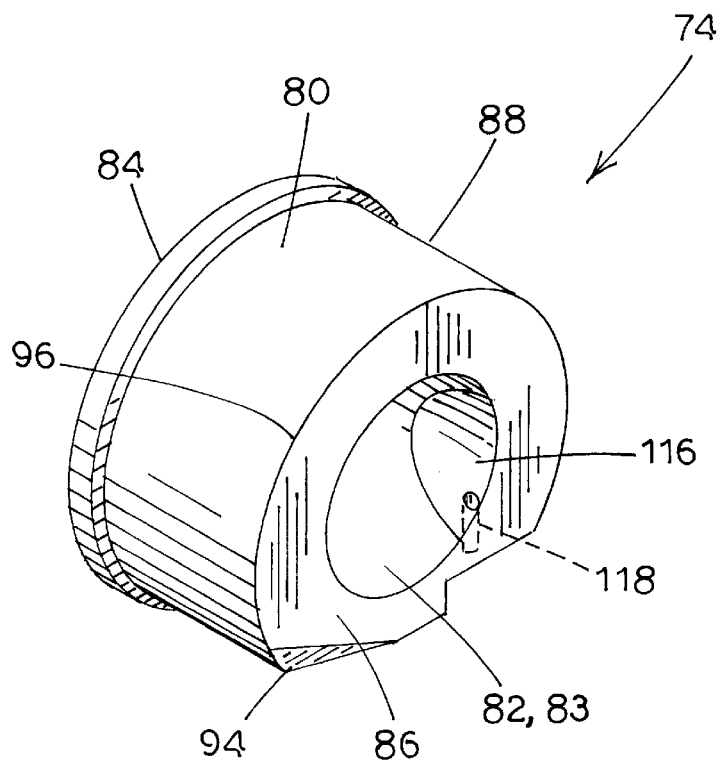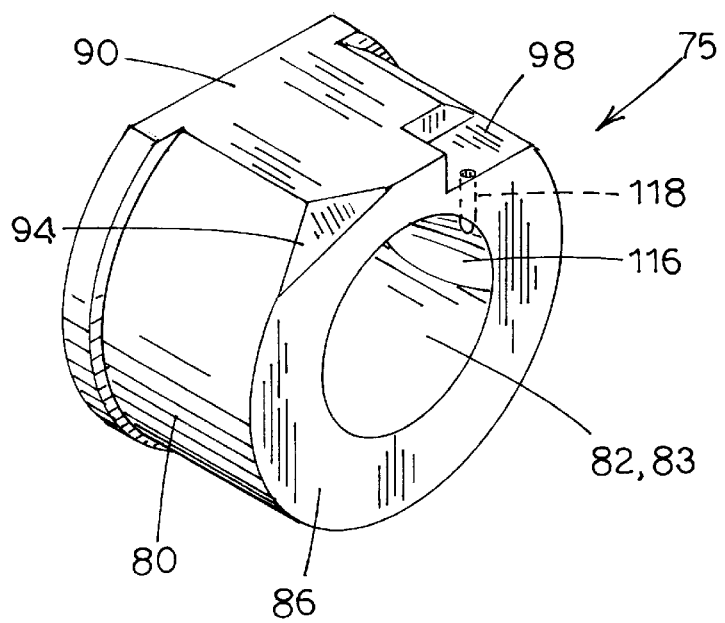
(PRIOR ART)
FIG. 4c

HIGH-PRESSURE, SELF-LUBRICATING JOURNAL BEARINGS

TECHNICAL FIELD

The present invention relates generally to apparatus and methods for lubricating a journal bearing and the rotating shaft of a fluid-containing housing, such as the drive shaft of a fluid-conveying pump. More particularly, the present invention relates to apparatus and methods for providing an efficient lubricating flow path in a journal bearing for viscous material conveyed in a gear pump under high-pressure and high-temperature conditions.

BACKGROUND ART

Various types of pumps are utilized in fluid transporting systems in order to develop and maintain a desired amount of flow energy in the fluid. Many of these pumps require for their operation at least one rotatable shaft to drive a mechanical energy-transferring device such as a piston, impeller, or gear. Typically, the rotational power or torque transmitted to the shaft is generated in a motor disposed in remote relation to the pump housing. One example is a gear pump, which is utilized in a number of well known applications to meter and discharge various types of fluids.

The gear pump may generally be described as being a rotary, positive displacement pump. In its most basic design, the gear pump includes a pair of intermeshing spur, single-helical or double-helical (i.e., herringbone) gears disposed in a housing having tight internal dimensional tolerances. One gear serves as the driving gear and is rotatable with a drive shaft (i.e., the shaft powered by a motor). The other gear serves as the driven gear and is rotatable on an idler shaft. The shafts are usually mounted in journal bearings on each side of the gears. In operation, the gears create a pressure differential between a suction side and a discharge side of the gear pump housing. The working fluid is drawn into the housing at the suction side, is carried by the teeth of each gear in spaces defined by the teeth and one or more internal surfaces of the housing, and is squeezed out on the discharge side. This design results in a relatively constant rate of fluid flow with a minimum of drifting or slippage. The flow rate is dependent on gear rotational speed, but is largely unaffected by viscosity variations and pressure differential variations across the gear pump.

The performance characteristics of the gear pump make it especially useful in the processing of high-shear polymers such as rubber, PVC, and EDPM, where pressure, volume and uniformity of the flowing material must be controlled. For example, the gear pump may be used to transport synthesis polymeric material from a reaction vessel. The gear pump may also be used in connection with an extruder. A typical extruder includes an elongate barrel containing a rotating auger or screw. A hopper feeds pellets or granules of the polymeric material to the barrel, where the material is heated and melted as it is forced along the length of the barrel by the screw. In such an application, the gear pump is installed between the extruder and an extrusion die to pressurize and meter the polymer melt flow, and to dampen any pressure fluctuations or surges caused by the rotating screw of the extruder. Because the gear pump moves fluid more efficiently than the extruder and reduces the load on the extruder, the gear pump itself can be used to develop the high pressure needed in the fluid line. This enables the discharge pressure of the extruder to be separately adjusted to a reduced level in better accord with the extruder's own optimal operating point. Finally, the gear pump may be installed in line with two or more extruders as part of a compounding or mixing process to obtain similar advantages.

In polymeric material processing, the bearings selected for the gear pump are typically hydrodynamic and preferably self-lubricating. That is, instead of using a separate lubrication method such as a forced oil circulation system, the gear pump and bearings are designed with flow paths for diverting a portion of the incoming polymer melt flow and circulating that portion between the bearings and shafts prior to discharge from the gear pump. The diversionary lubricant flow path may originate on the low-pressure suction side of the pump or on the high-pressure discharge side. In either case, as the shaft rotates and polymeric material is forced into the flow path, the diametrical clearance existing between the journal area of the bearing and the outer surface of the shaft permits a wedge-shaped polymeric film to develop therein. As a result, a hydrodynamic pressure is generated in the film that is sufficient to float the journal portions of the shafts and support the loads applied to them.

Because the film is wedge-shaped, the journal portion of each shaft rotates eccentrically rather than concentrically with respect to the bearing, the eccentricity being defined as the distance between the cross-sectional center of the shaft and the center of the bearing. A minimum film thickness will occur substantially coincident with a line running through the centers of the shaft and bearing. The performance of the bearing during operation of the gear pump will depend on this minimum film thickness, as well as on the viscosity of the lubricating polymer, the adhesion of the polymer to the surfaces of the journal and the bearing, the load on the bearing surfaces, the rotational speed of the shaft, the dimensions of the bearing, the applicable coefficients of friction, the flow rate of the polymer through paths designed between the bearing and journal, and the temperature rise of the lubricant.

It is well-known that frictional heat energy is produced as the journal portion of the rotating shaft does mechanical work on the polymeric film and induces shear stresses therein. Accordingly, the shear-sensitive polymeric material may become degraded and the film strength compromised, thereby reducing the efficacy of the polymeric material as a lubricating medium. Prior designs of self-lubricating bearings have not adequately addressed this problem. Examples of such prior designs are described below. It will be appreciated, then, that improvements in self-lubricating journal bearings are continuously being sought in order to induce less shear in the lubricating material, provide more effective lubrication, improve flow to the journal portion of the bearing, and provide more efficient output rates for the gear pump.

The present invention is therefore provided to solve these and other problems associated with the effective lubrication in the journal bearings of rotating shafts in general, and specifically with the high-pressure lubrication in hydrodynamic, self-lubricating journal bearings of rotating shafts utilized in gear pumps operating in polymer processing applications under high-pressure and high-temperature conditions.

DISCLOSURE OF THE INVENTION

In accordance with the present invention, a journal bearing is provided comprising a body having a central longitudinal axis, a cylindrical inner surface coaxially disposed around the longitudinal axis and defining an axial bore, and an outer surface including a peripheral planar section. A lateral face is disposed on an end of the body, and extends between the outer and inner surfaces of the body. A feed channel is formed in the lateral face at an acute angle with respect to the planar section and in an inward direction with respect to the axial bore. A first end of the feed channel communicates with the outer surface of the bearing at a location proximate to the planar section, and a second end of the feed channel communicates with the axial bore. A pocket is formed in the inner surface of the bearing in communication with the second end of the feed channel and extends along a substantially helical path from the lateral face of the bearing. At least a portion of the pocket has a width of greater magnitude than a corresponding depth of the portion.

In another embodiment of the invention, a journal bearing comprises a body having a central longitudinal axis, a cylindrical inner surface coaxially disposed around the longitudinal axis and defining an axial bore, and an outer surface including a peripheral flat section. A lateral face is disposed on an end of the body and extends between the outer and inner surfaces. A feed channel is formed in the lateral face at an acute angle with respect to the flat section and in an inward direction with respect to the axial bore. An entrance end of the feed channel communicates with the outer surface of the bearing at a location proximate to the flat section, and an exit end of the feed channel communicates with the axial bore. A recess is formed in a boundary defined between the outer surface and the lateral face of the bearing, and has a first edge disposed on the outer surface and a second edge disposed on the lateral face. The second edge of the recess and an edge of the feed channel cooperatively meet at a corner edge on the lateral face. A pocket is formed in the inner surface of the bearing in communication with the exit end of the feed channel and extends along a substantially helical path from the lateral face.

In another embodiment of the invention, a gear pump is provided comprising a rotatable first shaft including a first gear disposed within a chamber. A first bearing means with inner and outer surfaces is disposed on the first shaft, and includes a radial face extending between the inner and outer surfaces. The first bearing means is disposed adjacent to the first gear. The inner surface of the first bearing means and the first shaft define a first annular clearance space. A means disposed on the radial face of the first bearing means provides a feed path from a first location proximate to the outer surface of the first bearing means to a second location proximate to the first annular clearance space. The feed path is disposed at an acute angle with respect to a first flat section of the outer surface. A means disposed on the inner surface of the first bearing means provides a substantially helical path from the second location to an interior location on the inner surface, and receives a fluid flowing from the feed path providing means. The substantially helical path and the first shaft both have a similar rotational orientation. Rotation of the first shaft permits the fluid received in the substantially helical path to be distributed throughout the first diametrical clearance space. The gear pump may also include a second bearing means disposed on a second shaft having a second gear engaging the first gear of the first shaft.

A method is also provided for lubricating a first shaft of a gear pump and comprises the following steps. A bearing is provided which includes a body having a central longitudinal axis, a cylindrical inner surface coaxially disposed around the longitudinal axis and defining an axial bore, an outer surface including a peripheral planar section, and a lateral face disposed on an end of the body and extending between the outer surface and the inner surface. A feed channel is formed in the lateral face of the bearing at an acute angle with respect to the planar section and is inwardly directed toward the axial bore from a discharge side of the gear pump. A pocket is formed in the inner surface of the bearing in fluid communication with the feed channel. The pocket extends from the lateral face of the bearing into the axial bore along a substantially helical path. The substantially helical path and the first shaft both have a similar rotational orientation. A portion of the first shaft is rotatably supported in the bearing by extending the shaft through the axial bore of the bearing, such that the lateral face of the bearing is adjacent to a gear disposed on the first shaft. The gear of the first shaft is placed in rotatable meshing engagement with a gear of a second shaft. A portion of fluid flowing in the gear pump on the discharge side is diverted into the feed channel. The diverted fluid is forced from the feed channel into the pocket to evenly distribute the diverted fluid throughout the axial bore between the inner surface of the bearing and the first shaft.

Therefore, it is an object of the present invention to provide an improved, self-lubricating bearing for use with a rotating shaft.

It is another object of the present invention to provide a self-lubricating bearing which has a direct pathway for feeding a lubricating medium thereto.

It is another object of the present invention to provide a self-lubricating bearing with an improved structure for evenly distributing a lubricating medium while inducing less shear stresses in the lubricating medium.

Some of the objects of the invention having been stated hereinabove, other objects will become evident as the description proceeds, when taken in connection with the accompanying drawings as best described hereinbelow.

BRIEF DESCRIPTION OF THE DRAWINGS

FIG. 4C is a perspective view of a third self-lubricating bearing known by persons skilled in the art;

DETAILED DESCRIPTION OF THE PREFERRED EMBODIMENT

Figure 1:
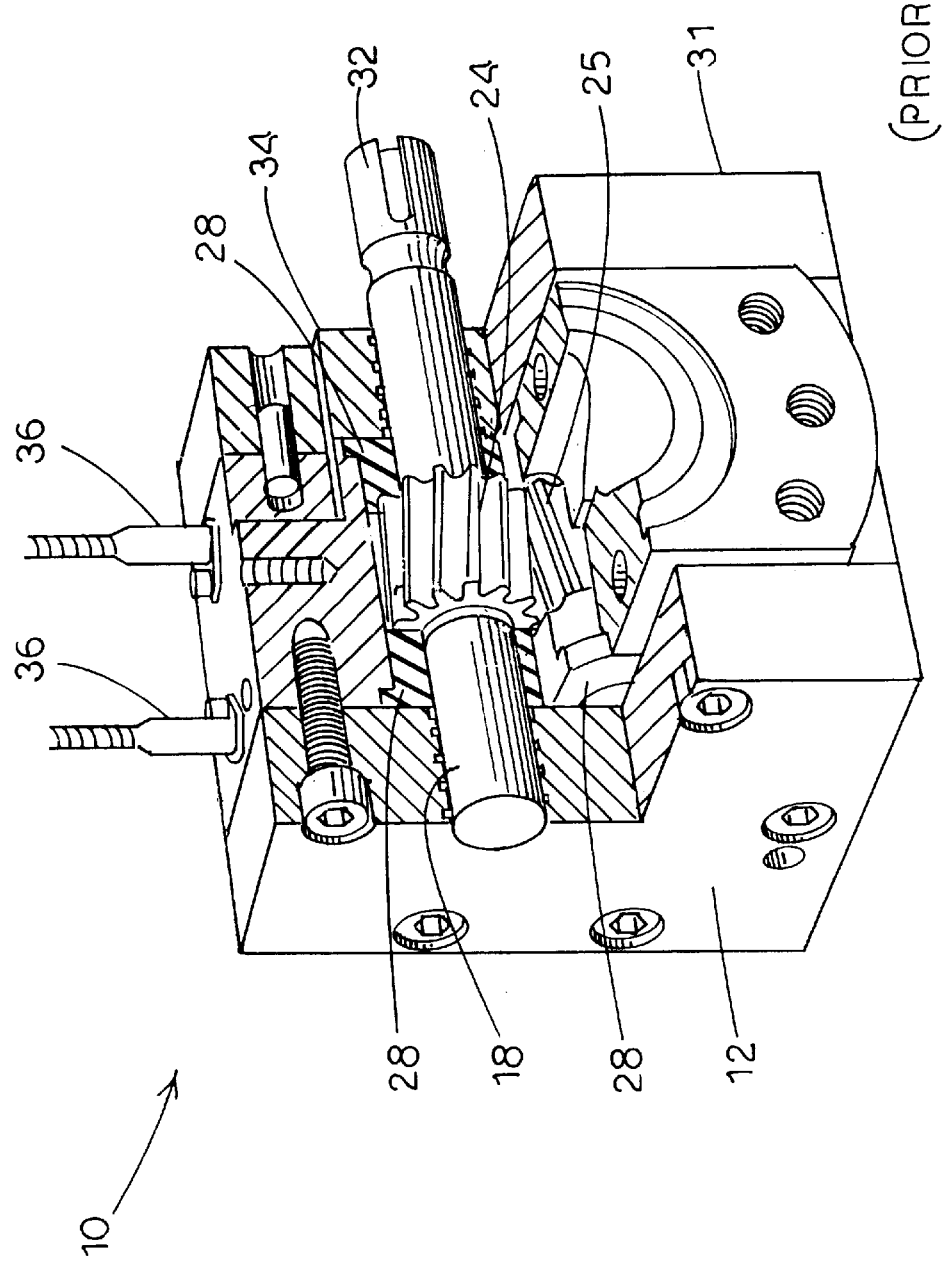
FIG. 1 is a perspective partial cutaway view of a conventional gear pump to which the present invention may be applied.
Figure 2:
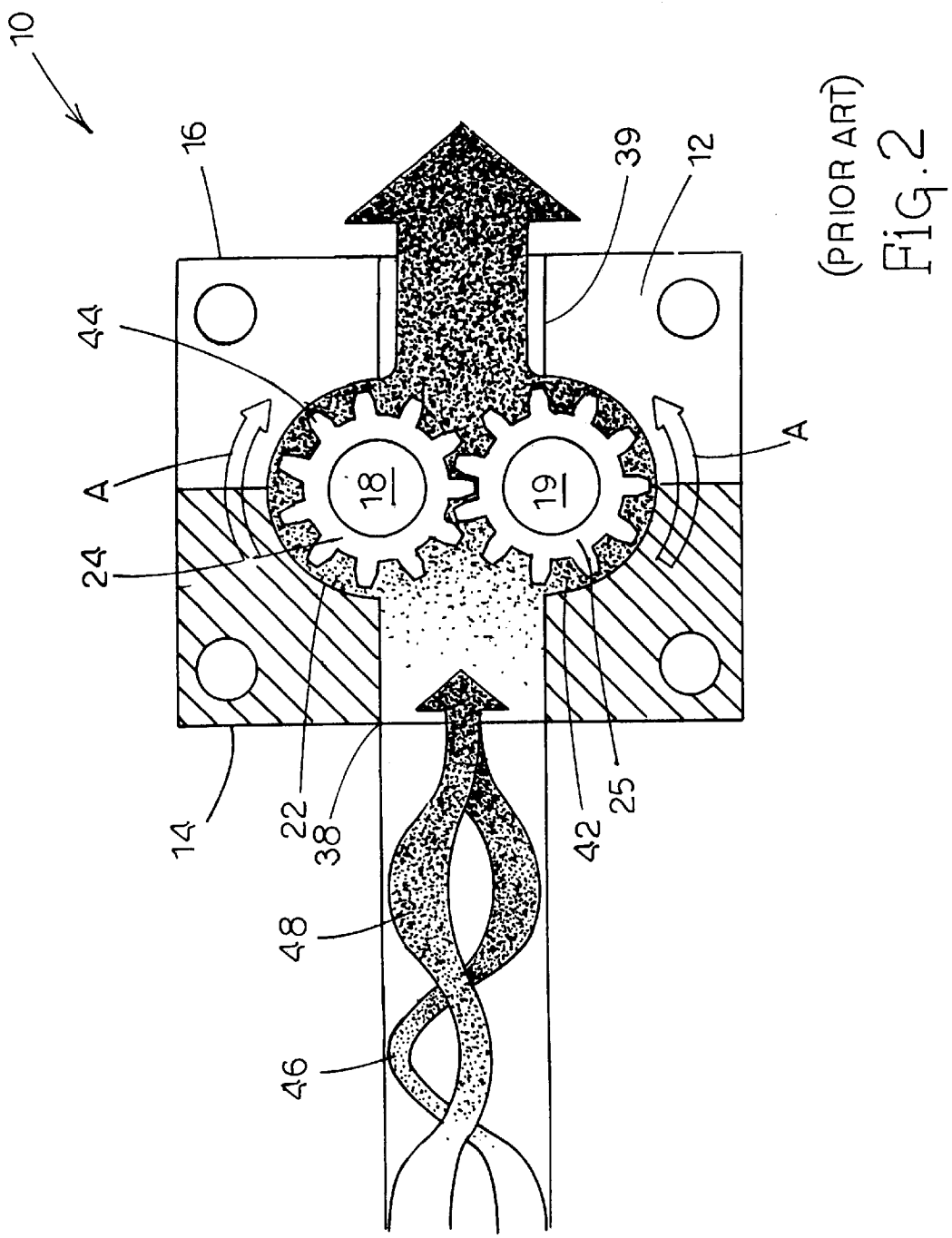
FIG. 2 is a vertical cross-sectional view of a conventional gear pump showing the fluid moving operation of the gear pump.

FIGS. 1 and 2 illustrate the main components of a conventional gear pump generally designated 10. Gear pump 10 has a main housing 12 with a suction side 14 and a discharge side 16. A drive shaft 18 and an idler shaft 19 are mounted in a pump cavity 22 within main housing 12 in parallel relation. Drive shaft 18 includes a driving gear 24 and idler shaft 19 includes a driven gear 25 meshing with driving gear 24. Each shaft 18, 19 is rotatably mounted in one or more hydrodynamic, self-lubricating journal bearings 28. Drive shaft 18 extends through a sealing side 31 of main housing 12 and includes a keyway spline 32 or similar means for coupling drive shaft 18 with transmission and prime moving means (not shown) such as a gear reduction box and motor, respectively. Sealing means 34 are included to prevent leakage of polymeric material from gear pump 10. One or more heating elements 36 may be included to enable rapid transition of gear pump operation from initial to steady-state conditions.

As best shown in FIG. 2, main housing 12 has an inlet port 38 on suction or low-pressure side 14 and an outlet port 39 on discharge or high-pressure side 16. In operation, the rotating shafts 18, 19 cause gears 24, 25 to mesh in the direction shown by arrows A. This movement creates a pressure differential across gear pump 10. Accordingly, material is drawn into main housing 12 on suction side 14 and is carried in spaces 42 defined by teeth 44 and pump cavity 22 of housing 12. The material is then discharged at high pressure on discharge side 16. In most cases, gear pump 10 effectively dampens the undesirable conditions occasioned by screwbeat 46 and surge 48 from an upstream extruder and provides a uniform, pressurized flow of material for further processing.

Figure 3:
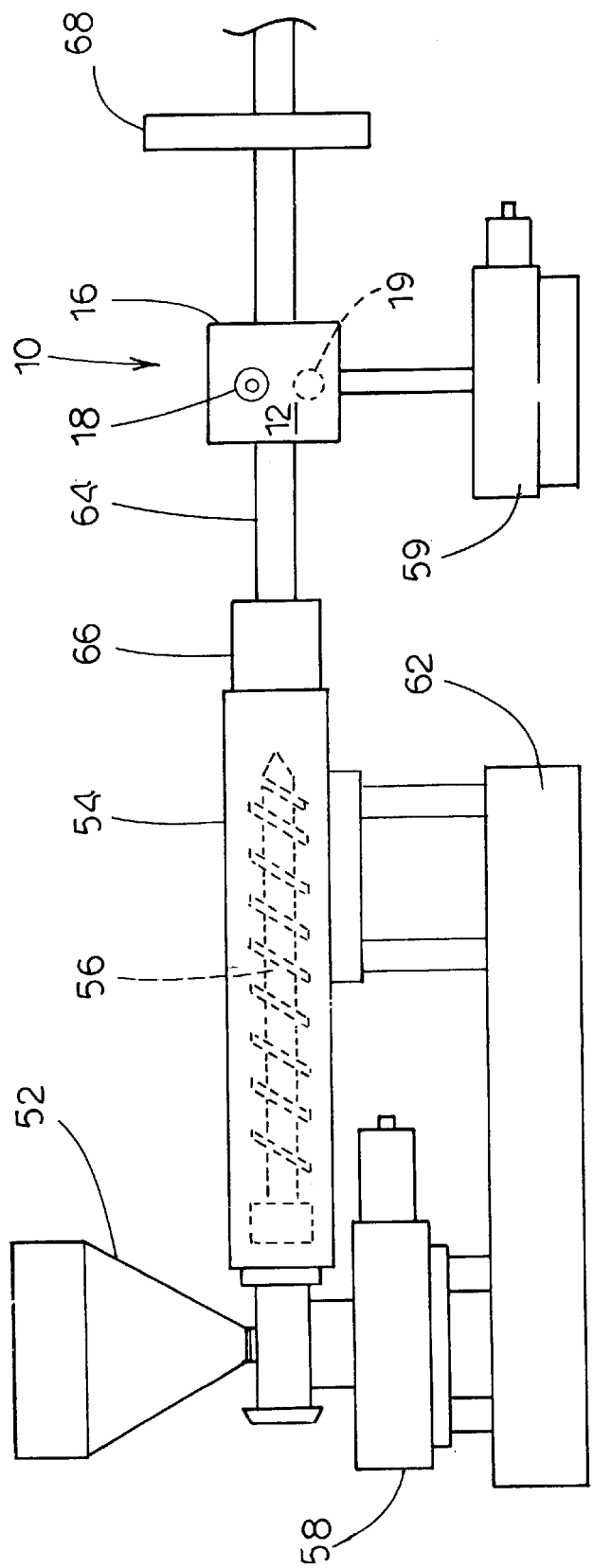
FIG. 3 is a side elevation view of a portion of a polymer processing system wherein a gear pump is utilized.

FIG. 3 illustrates gear pump 10 installed in a polymer processing application. A hopper 52 delivers pelletized or granulated polymer feedstock to an extruder 54. Extruder 54 includes an auger or screw 56 and means for heating and melting the polymer feedstock. Auger 56 and gear pump 10 are powered by motors 58, 59. Extruder 54 and motor 58 are mounted on appropriate support means 62. Melted polymeric extrudate exits extruder 54 and flows toward gear pump 10 along a process line or conduit 64. A screen or filter means 66 may be interposed between extruder 54 and gear pump 10. From discharge side 16 of gear pump 10, the pressurized and heated polymeric extrudate flows through a die 68. Depending on the particular application, die 68 is adapted to extrude a sheet, tube or other profile. Other components such as cooling units and slitters (not shown) may be installed downstream of die 68 as needed.

FIGS. 4A–4D and 5 illustrate four pairs of bearings 70–71, 72–73, 74–75, and 76–77 included within the prior art for use in gear pumps. Each of bearings 70–77 includes an annular body 80 with a cylindrical inner surface 82 defining an axial bore 83 into which a shaft 18, 19 is mounted as in FIGS. 1 and 5. One side of each bearing 70–77 typically includes a flange 84, and the other side has a lateral face 86 which in assembled form abuts a gear on shaft 18, 19. Outer surfaces or peripheries 88 of each bearing 70–77 are generally cylindrical, but include a flattened section 90 such that each bearing 70–77 is D-shaped. In the assembled form shown in FIG. 5, each of bearings 70, 72, 74, 76 mates with its corresponding bearing 71, 73, 75, 77 through abutment of flattened sections 90 so as to render each bearing 70, 72, 74, 76 oppositely symmetrical to its corresponding bearing 71, 73, 75, 77 with respect to a plane 92 (see FIG. 5) defined between mated flattened sections 90. Each bearing 70–77 may also include a chamfered corner 94 formed on an annular edge 96 defined between outer surface 88 and lateral face 86 and proximate to flattened section 90. A rectangular recess 98 is formed on annular edge 96 at another corner near flattened section 90. In the assembled form of mated bearings 70–77, chamfered corners 94 form an angular recess 102 (see FIG. 5) on suction side 14 of pump 10 to assist in drawing inputted material such as viscous polymeric material into gear spaces 42 (see FIG. 2). Rectangular recesses 98 of each bearing pair coact to form a pressure relief recess 104 (see FIG. 5) to assist in discharging material from gear spaces 42 and directing the material through outlet 39.

Figure 4A:
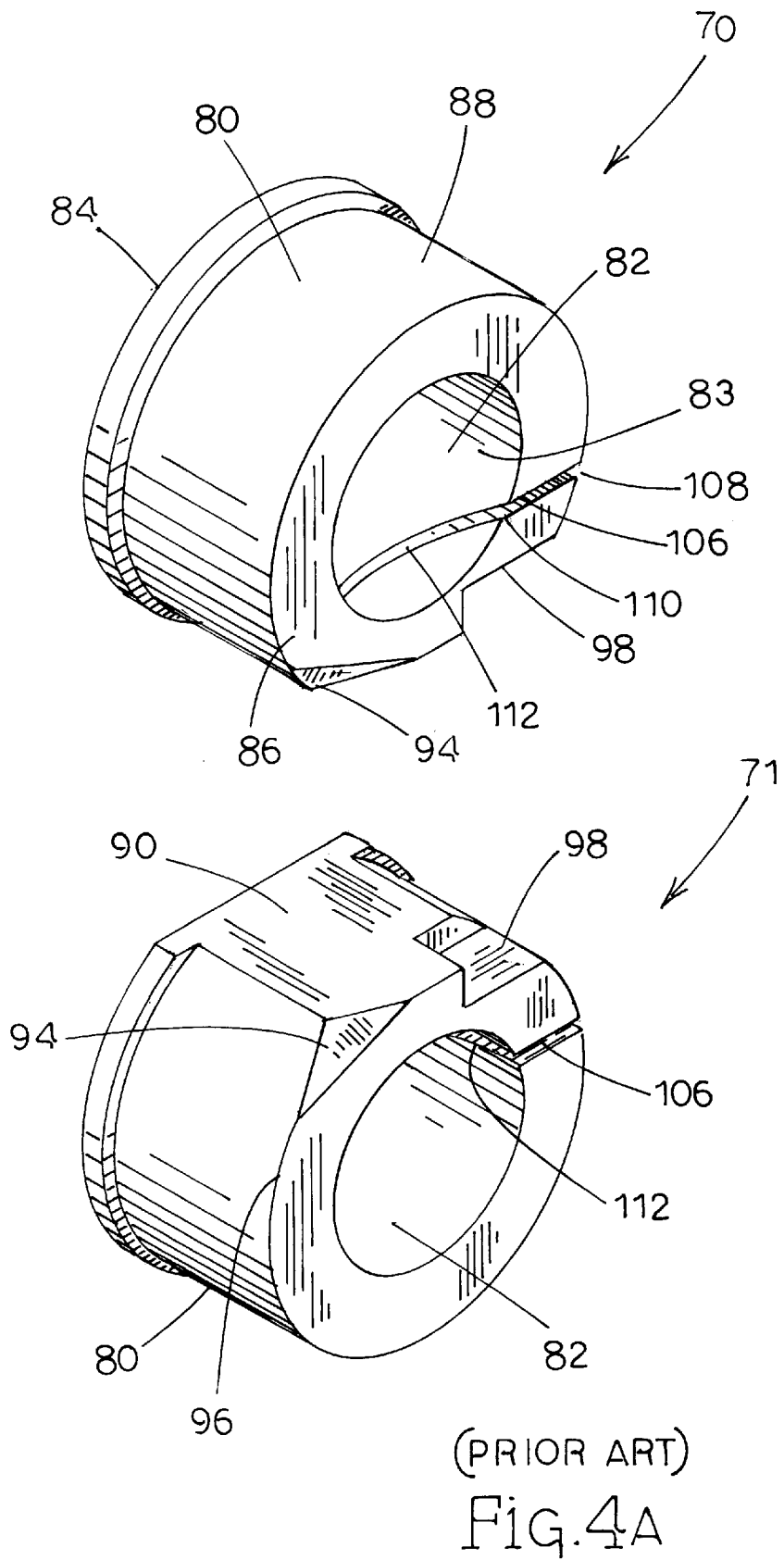
FIG. 4A is a perspective view of a self-lubricating bearing known by persons skilled in the art.

The particular bearing designs depicted in FIGS. 4A–4D represent some of the many prior approaches employed in improving the flow path for diverted material to be used in lubricating shafts of gear pump 10. In FIG. 4A, a linear feed channel 106 is formed on lateral face 86 for diverting a portion of the material being pumped by gear pump 10 into axial bore 83. Linear feed channel 106 is parallel to plane 92 defined between flattened surfaces 90. An entrance end 108 of linear feed channel 106 opens directly into pump cavity 22 (see FIG. 2) on discharge side 16 at a point on annular edge 96 spaced a distance from rectangular recess 98. A terminal end 110 of linear feed channel 106 communicates with an arcuate channel 112 formed on inner surface 82 of annular body 80 for admitting material into axial bore 83 and distributing the material around axial bore 83, thereby lubricating shafts 18, 19 disposed therein. The cross-sectional areas of linear feed channel 106 and arcuate channel 112, however, are not large enough to ensure even distribution of material to axial bore 83. In addition, this design in many cases cannot maintain a film layer of sufficient strength. Finally, the small cross-sectional areas combined with the sharp edges of the linear feed and arcuate channels 106, 112 promotes an undesirable amount of shearing in the lubricating material.

Figure 4B:
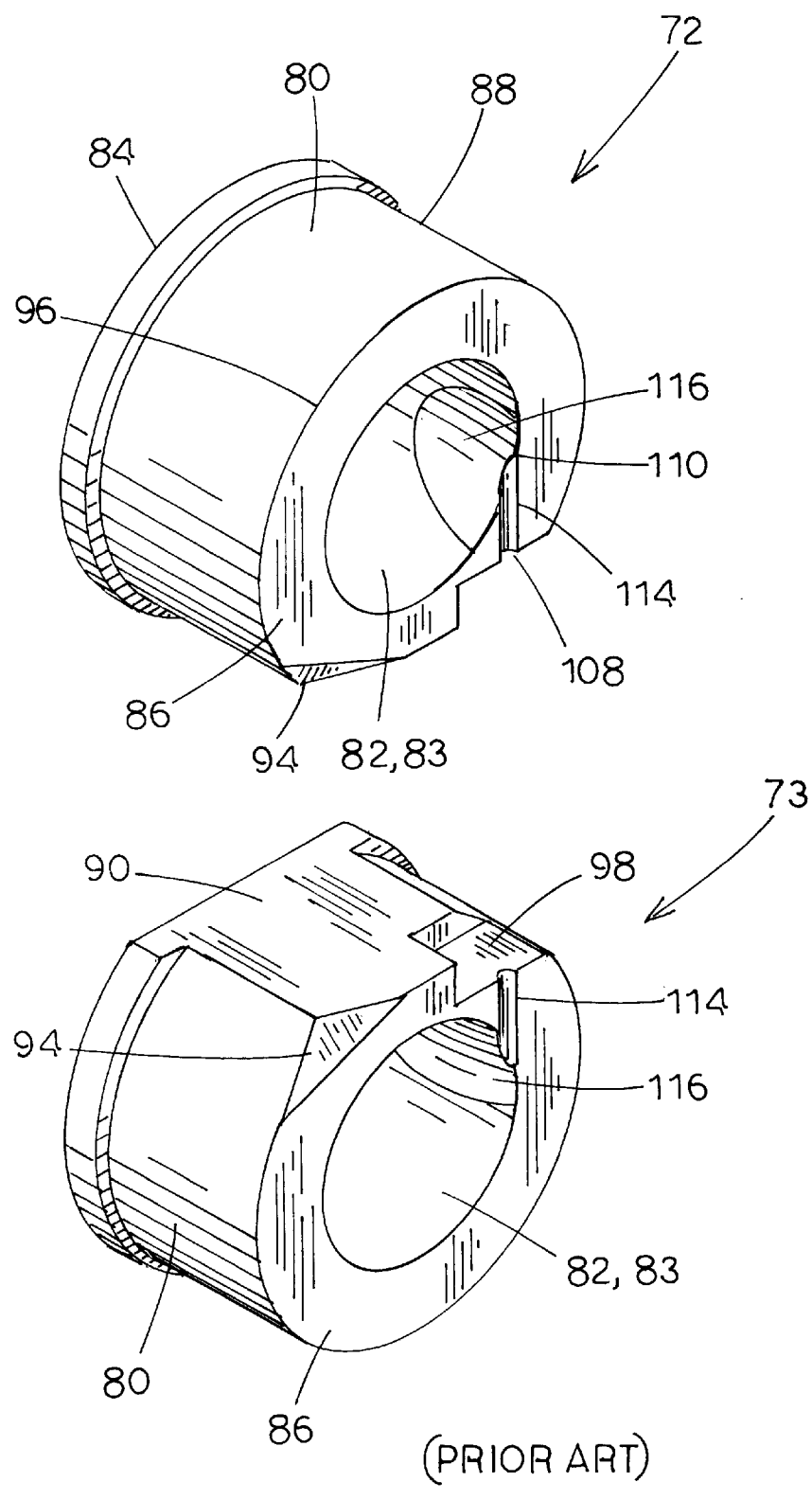
FIG. 4B is a perspective view of another self-lubricating bearing known by persons skilled in the art.

In FIG. 4B, a linear feed channel 114 is formed on lateral face 86 in orthogonal relation to flattened section 90. An entrance end 108 opens into rectangular recess 98. A terminal end 110 communicates with a parabolic recess 116 formed on inner surface 82. Parabolic recess 116 runs along an axis parallel to the longitudinal axis of shaft 18, 19 and has a tapering depth and width. Parabolic recess 116 is superior to arcuate channel 112 in FIG. 4B for distributing lubricating material to axial bore 83 and forming a film layer therein. However, the flow path provided by this design includes sharp turns and sharp edges, which impair the flow rate into parabolic recess 116 and promote shearing.

In FIG. 4C, a linear bore 118 is formed in annular body 80 transverse to rectangular recess 98 and opens into a parabolic recess 116 similar to that shown in FIG. 4B. As in the design of FIG. 4B, the flow path provided in FIG. 4C is tortuous and occasioned by the same problems. In addition, the small circular cross section of linear bore 118 creates excessive drag on the diverted material, and is not exposed to the clearance defined between lateral face 86 and an abutting gear in an assembled gear pump. This design therefore provides an inadequate lubricating path for bearings 74, 75 and their associated shafts 18, 19.

Figure 4D:
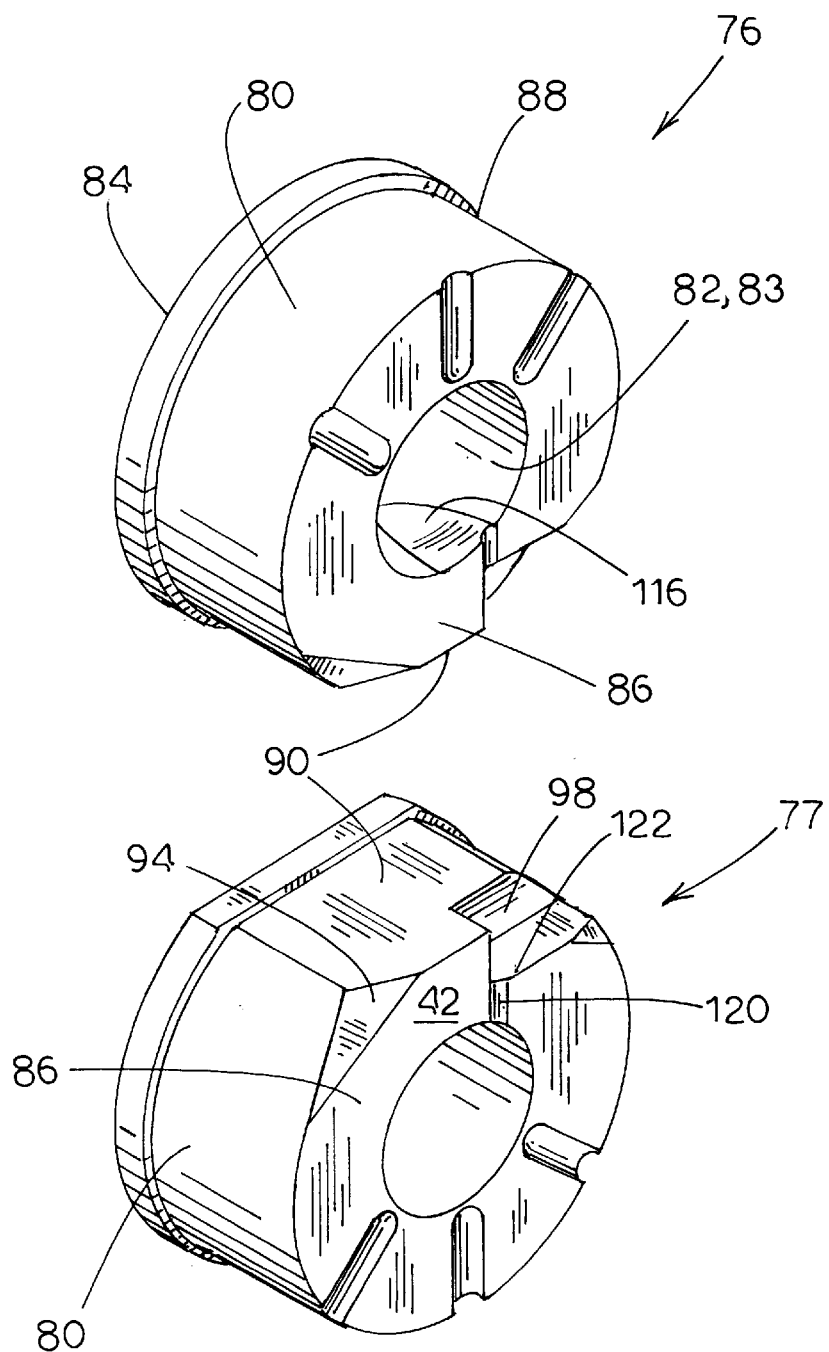
FIG. 4D is a perspective view of a fourth self-lubricating bearing known by persons skilled in the art.
Figure 5:
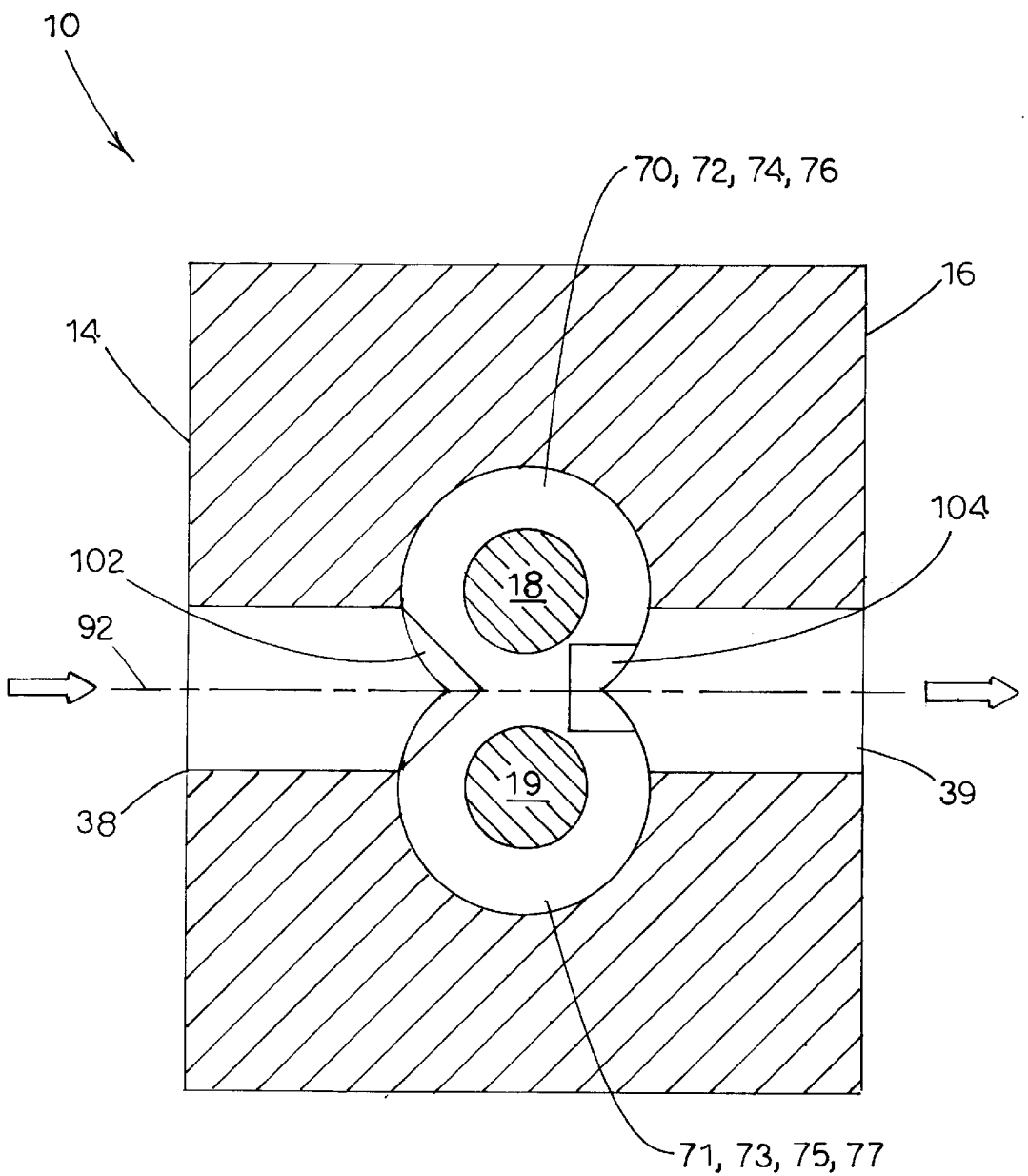
FIG. 5 is a vertical side cross-sectional view of a conventional gear pump with a pair of bearings installed therein.

In FIG. 4D, a linear channel 120 and parabolic recess 116 are configured in a manner similar to the design shown in FIG. 4B. Linear channel 120, however, is formed in communication with an inward corner 122 of rectangular recess 98. This design provides a shorter path to parabolic recess 116, but is nonetheless tortuous and characterized by sharp turns and edges.

Figure 6:
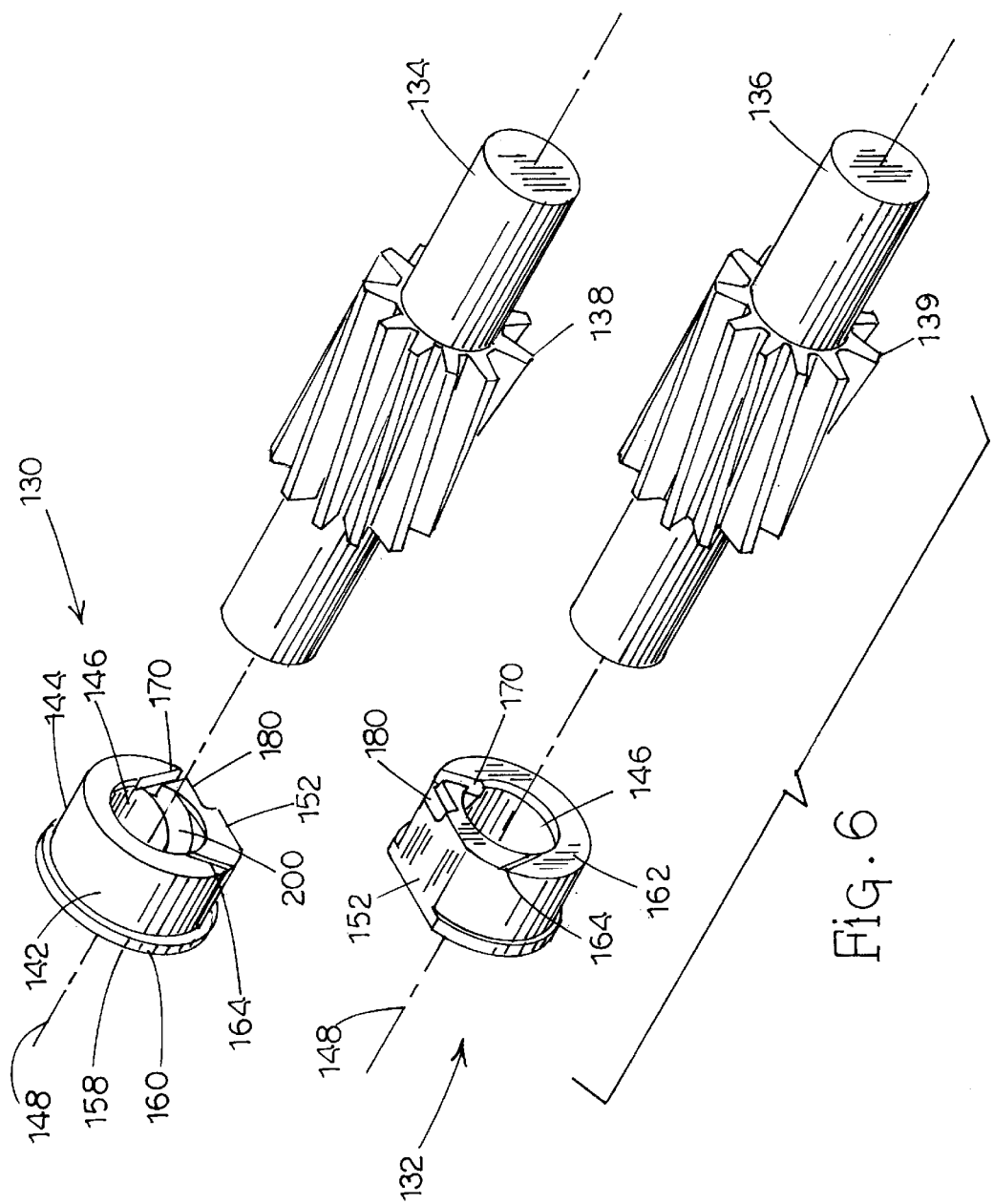
FIG. 6 is a perspective view of a pair of bearings and associated shafts according to the present invention.

FIGS. 6–15 illustrate exemplary embodiments of the present invention which significantly improve the flow and distribution of material used for lubricating shaft journals of a gear pump, improve retention of a strong film layer, and reduce the amount of shear in the lubricating material. Referring to FIG. 6, a pair of self-lubricating bearings generally designated 130, 132 are provided for supporting and lubricating a drive shaft 134 and idler shaft 136 and their associated gears 138, 139. Shafts 134, 136 and gears 138, 139 preferably have a one-piece construction. For convenience, the preferred structure of the present invention will be described with respect to either of bearings 130, 132 with the understanding that the features of the other corresponding bearing 132, 130 are correspondingly similar.

Figure 9:
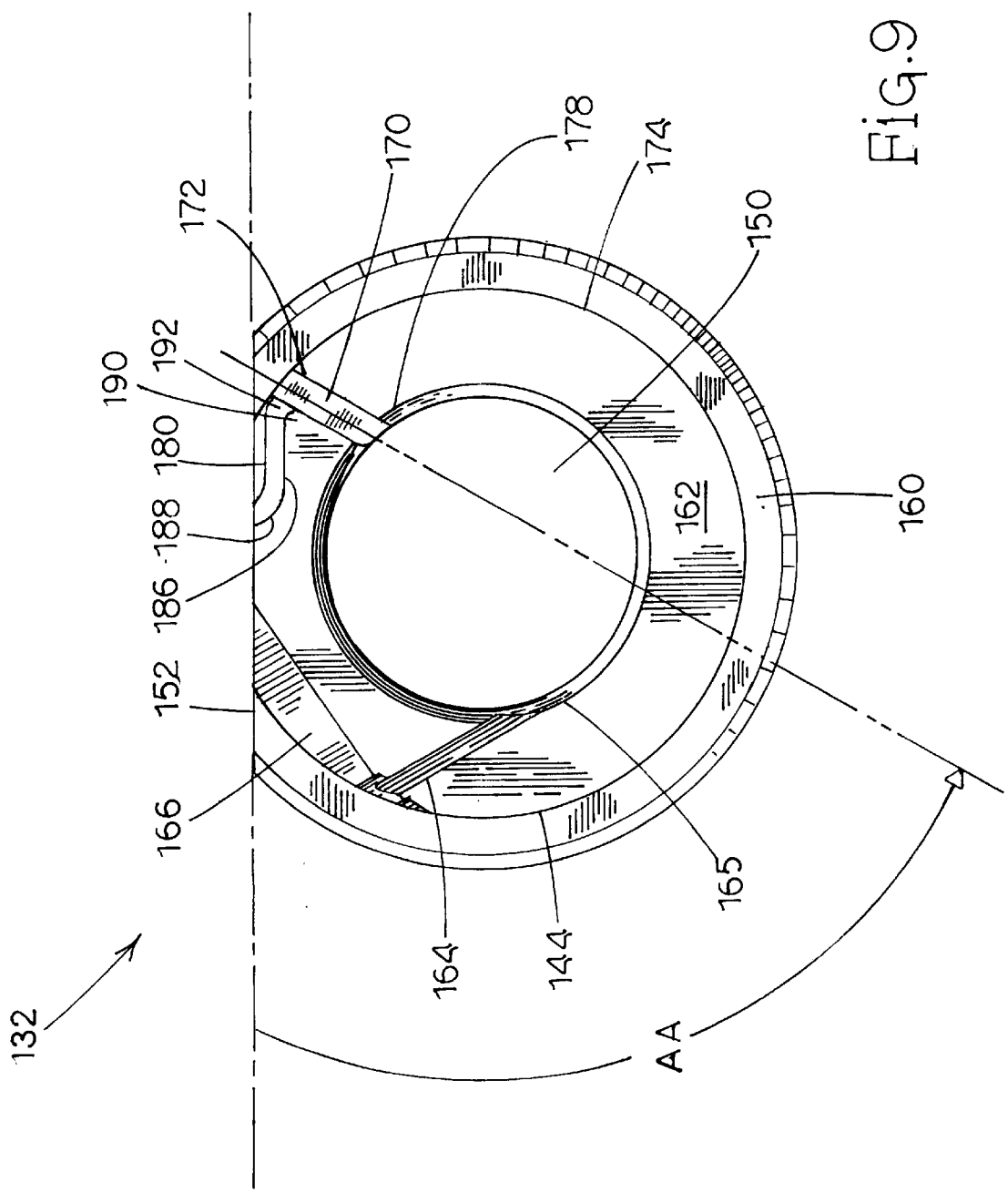
FIG. 9 is a side elevation view of one of the bearings in FIG. 6.

Each bearing 130, 132 includes an annular body 142 preferably constructed of nitrided steel. Annular body 142 includes an outer surface 144 and a cylindrical inner surface 146 coaxial with a longitudinal axis 148 of annular body 142. Inner surface 146 defines an axial bore 150 (see FIG. 9) into which either drive shaft 134 or idler shaft 136 is supported. Annular body 142 has a flattened or planar section 152 and accordingly is substantially D-shaped. In the assembled form shown in FIGS. 11–14, each bearing 130, 132 is disposed within a gear pump generally designated 154 in opposing symmetrical relation to the other about a plane 156 (see FIG. 13) defined by the abutment of flattened surfaces 152. An outside lateral face 158 of annular body 142 includes a flange 160, while an opposite, inside lateral face 162 is intended to abut gear 138 when mounted on shaft 134. Preferably, a wiper groove 164 is formed on inside lateral face 162 in tangential relation to axial bore 150 (see FIG. 9). An inner peripheral region 165, defined at the circumferential boundary of inner surface 146 and inside lateral face 162, provides a fluid pathway to wiper groove 164 as shown in FIG. 9. As also shown in FIG. 9, a chamfered portion 166 may also be formed on inside lateral face 162 if it is desired to provide a recess on suction side 168 of gear pump 154.

Figure 10:
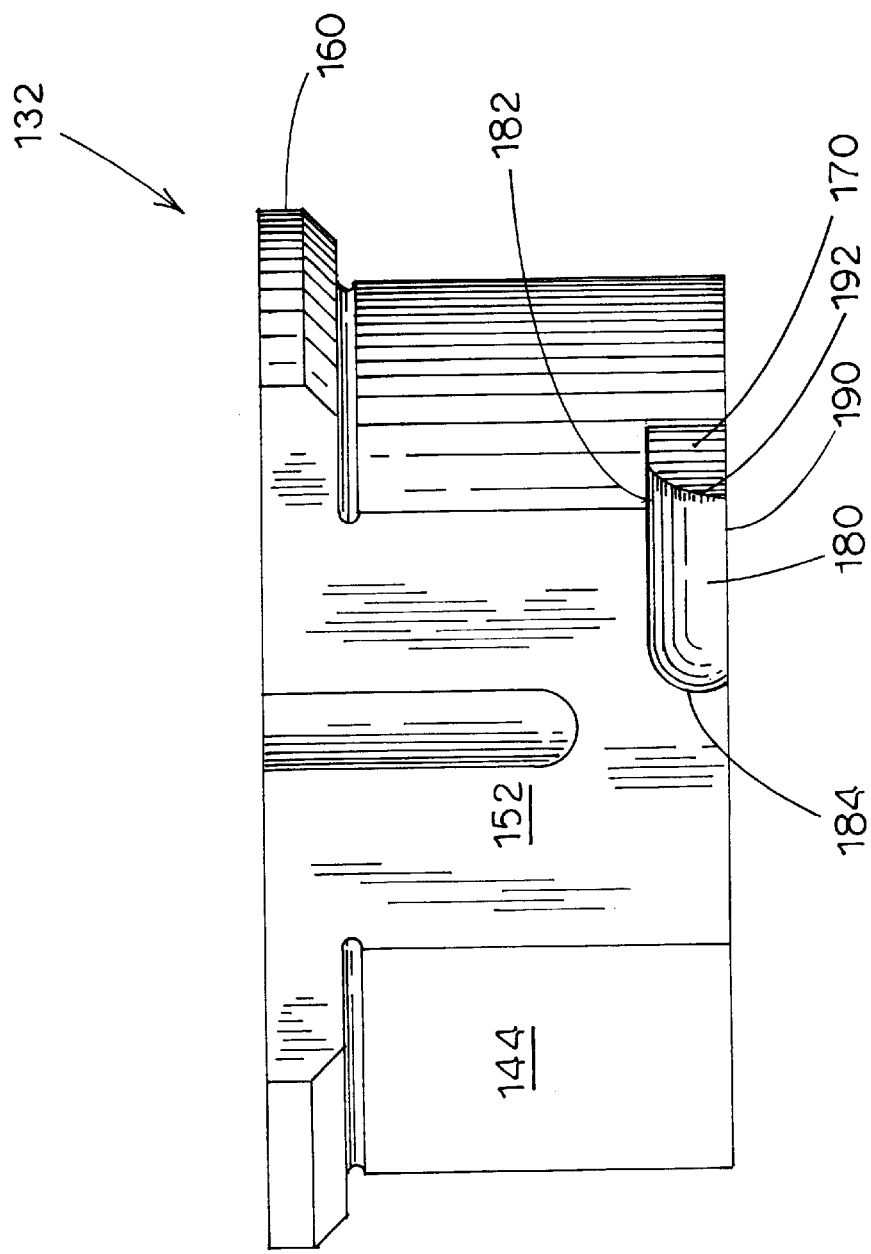
FIG. 10 is a top elevation view of one of the bearings in FIG. 6.
Figure 13:
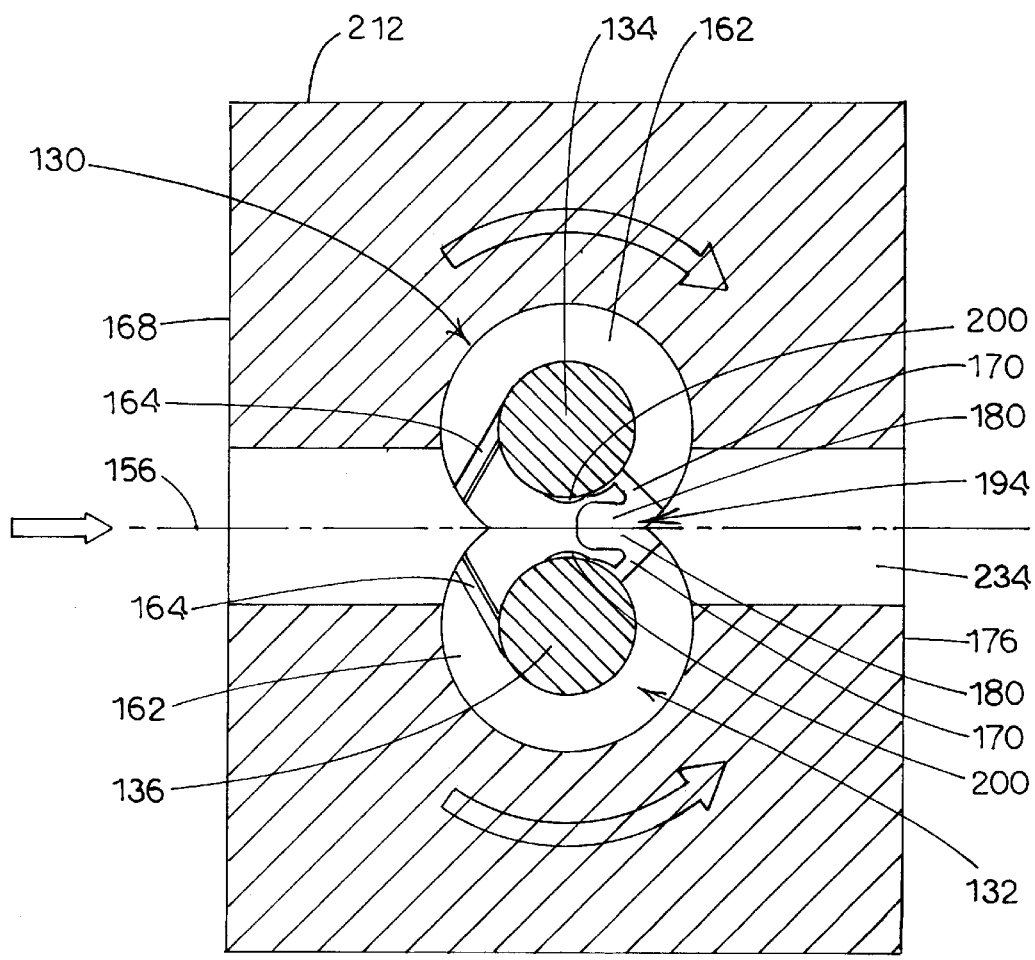
FIG. 13 is a vertical cross-sectional view of the gear pump in FIG. 11 taken along line 13—13.
Figure 14:
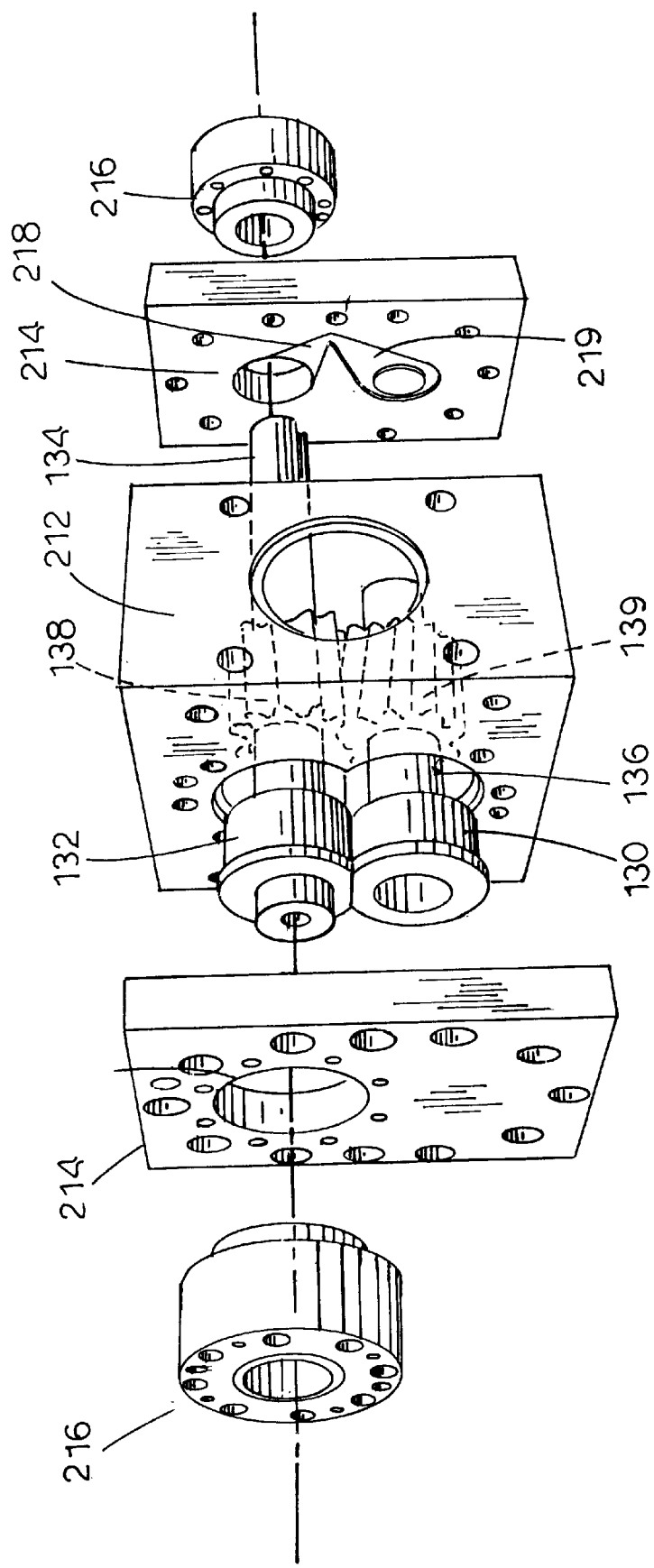
FIG. 14 is an exploded perspective view showing the main components of the assembled gear pump in FIG. 11.
Figure 15:
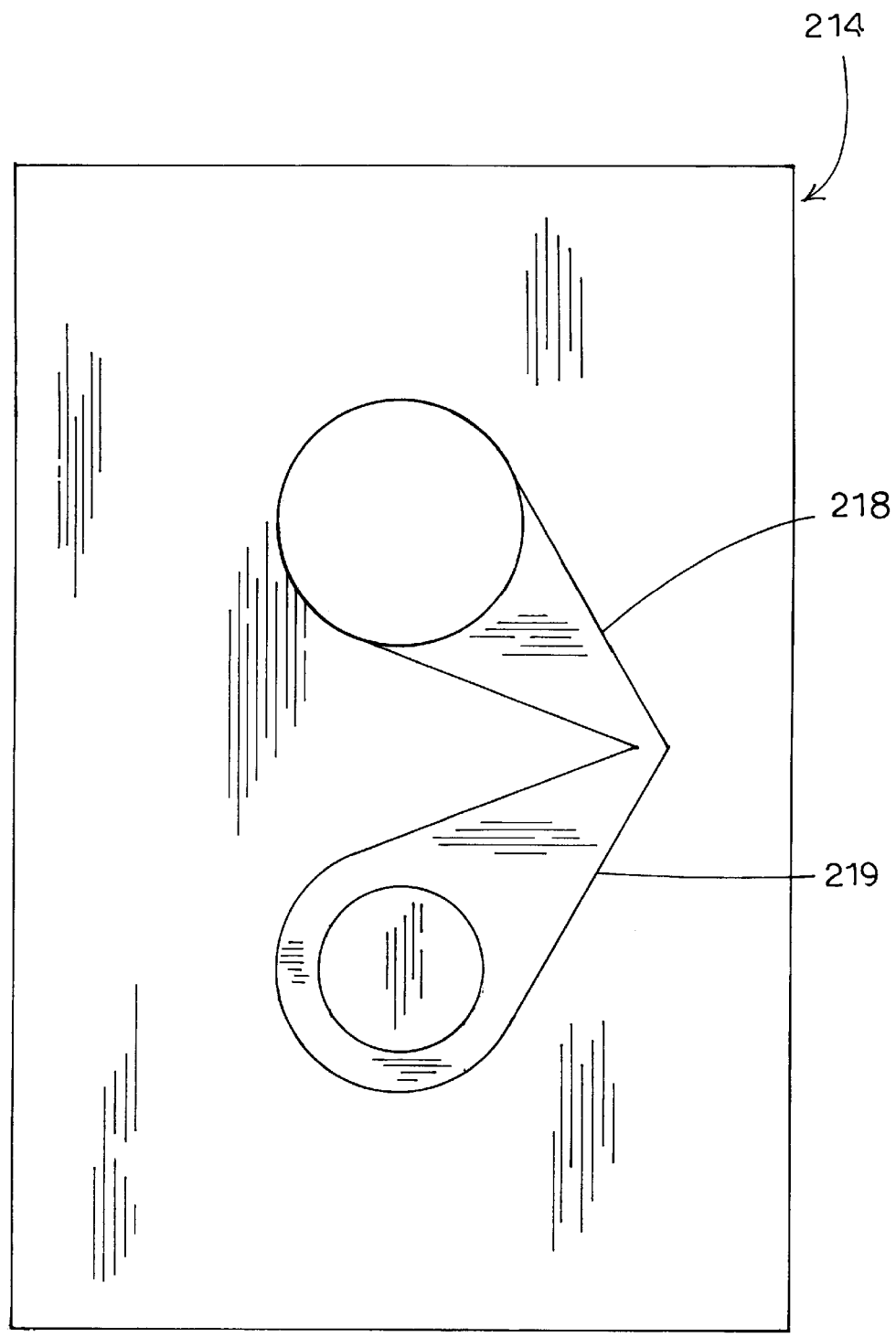
FIG. 15 is a side elevation view of an end plate of the gear pump in FIG. 14.

As best shown in FIG. 9, a linear feed channel 170 is formed on inside lateral face 162. An entrance end 172 of feed channel 170 opens on an annular edge 174 defined by the boundary of outer surface 144 and inside lateral face 162 of annular body 142. Entrance end 172 is located on discharge side 176 (see FIG. 13) of gear pump 154 proximate to flattened surface 152. An exit end 178 of feed channel 170 opens into axial bore 150. Feed channel 170 provides a linear path disposed at an acute angle AA subtending plane 156 or flattened surface 152 in the direction toward axial bore 150. A recess 180 is formed in annular edge 174 on a portion of flattened surface 152 nearest to discharge side 176 of gear pump 154. As best shown in FIGS. 9 and 10, a top edge 182 of recess 180 on flattened surface 152 includes an arcuate section 184 and a lateral edge 186 of recess 180 on inside lateral face 162 includes an arcuate section 188. A rounded corner 190 is defined on inside lateral face 162 near a junction 192 between recess 180 and feed channel 170, such that junction 192 gradually slopes into annular body 142 from inside lateral face 162 and recess 180 partially opens into feed channel 170. Recess 180 is formed between arcuate edges 184, 188 and sloping junction 192 so as to eliminate any sharp edges within recess 180. In assembled form as best shown in FIG. 13, recesses 180 and junctions 192 conjoin to create an enlarged pressure relief recess 194 for diverting material directly into bearings 130, 132.

Figure 7:
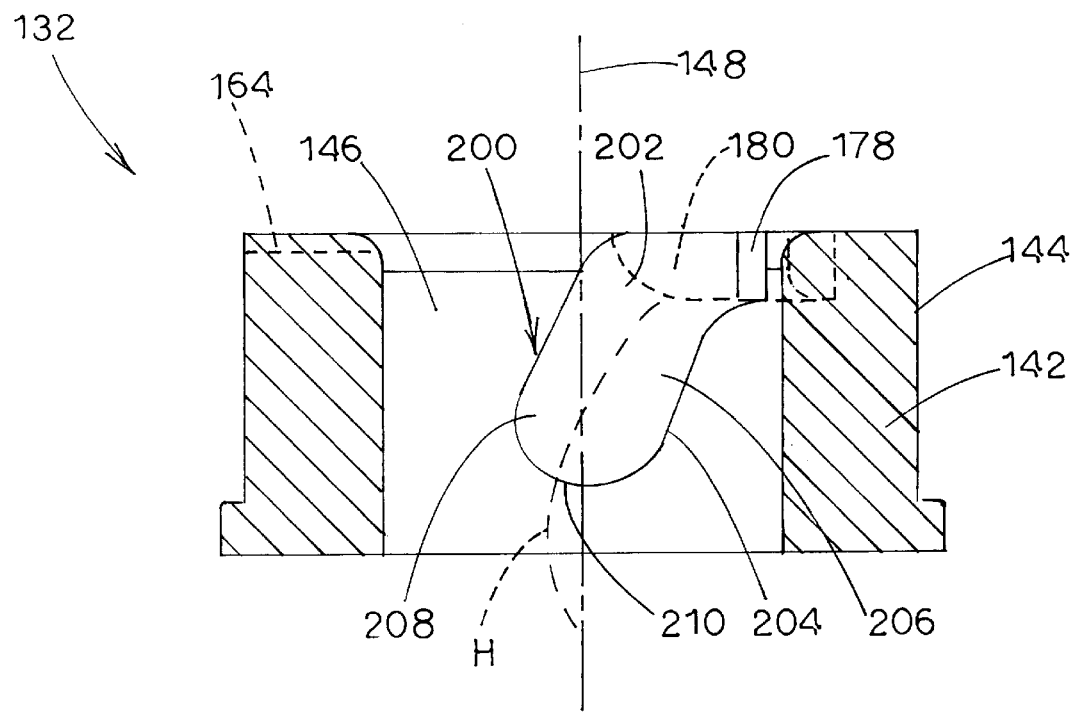
FIG. 7 is a vertical cross-sectional view of one of the bearings in FIG. 6 according to one embodiment of the present invention.
Figure 8:
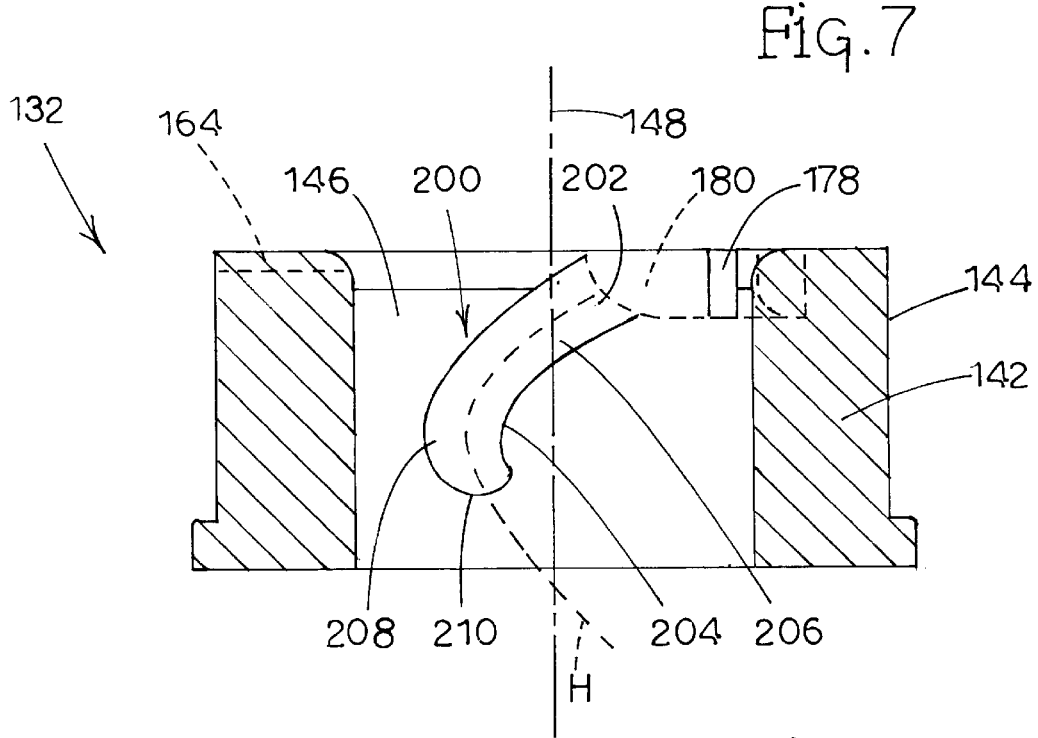
FIG. 8 is a vertical cross-sectional view of one of the bearings in FIG. 6 according to another embodiment of the present invention.

As best shown in FIGS. 6–8, an arcuate channel or recess is formed on inner surface 146 of annular body 142 and defines a pocket or puddle 200 for distribution of lubricating polymer to shafts 134, 136. Pocket 200 is disposed along a substantially helical curve H which turns in the direction of shaft rotation. An inlet end 202 of pocket 200 communicates with exit end 178 of feed channel 170. FIGS. 7 and 8 illustrate alternative, substantially helical shapes for pocket 200 defined by a peripheral edge or boundary 204 with respect to inner surface 146 of annular body 142. In each case, peripheral edge 204 circumscribes a main region 206 and a terminal region 208 of pocket 200. The depth of pocket 200 into inner surface 146 is greatest along helical curve H and is gradually reduced outwardly toward peripheral edge 204. Hence, peripheral edge 204 is not sharp but rather represents a smooth transition from inner surface 146 into annular body 142, and the interior of pocket 200 contains no sharp edges. In addition, the width of pocket 200 about helical curve H is greater than the depth of pocket 200 in its main region 206, and is gradually reduced to an apex 210 of terminal region 208.

Referring to FIGS. 11–14, gear pump 154 preferably includes two pairs of bearings 130, 132, i.e., one bearing 130, 132 for each shaft 134, 136 on each side of gears 138,139. In the exemplary embodiment of gear pump 154 as illustrated, bearings 130, 132 are installed in a main housing 212 of gear pump 154 between two end plates 214. Drive shaft 134 and its associated bearings 130, 132 are preferably sealed by sealing members 216 (see FIG. 14) bolted to gear pump 154 through end plates 214. Each end plate 214 has upper and lower recesses 218, 219 (see FIGS. 14 and 15).

Figure 11:
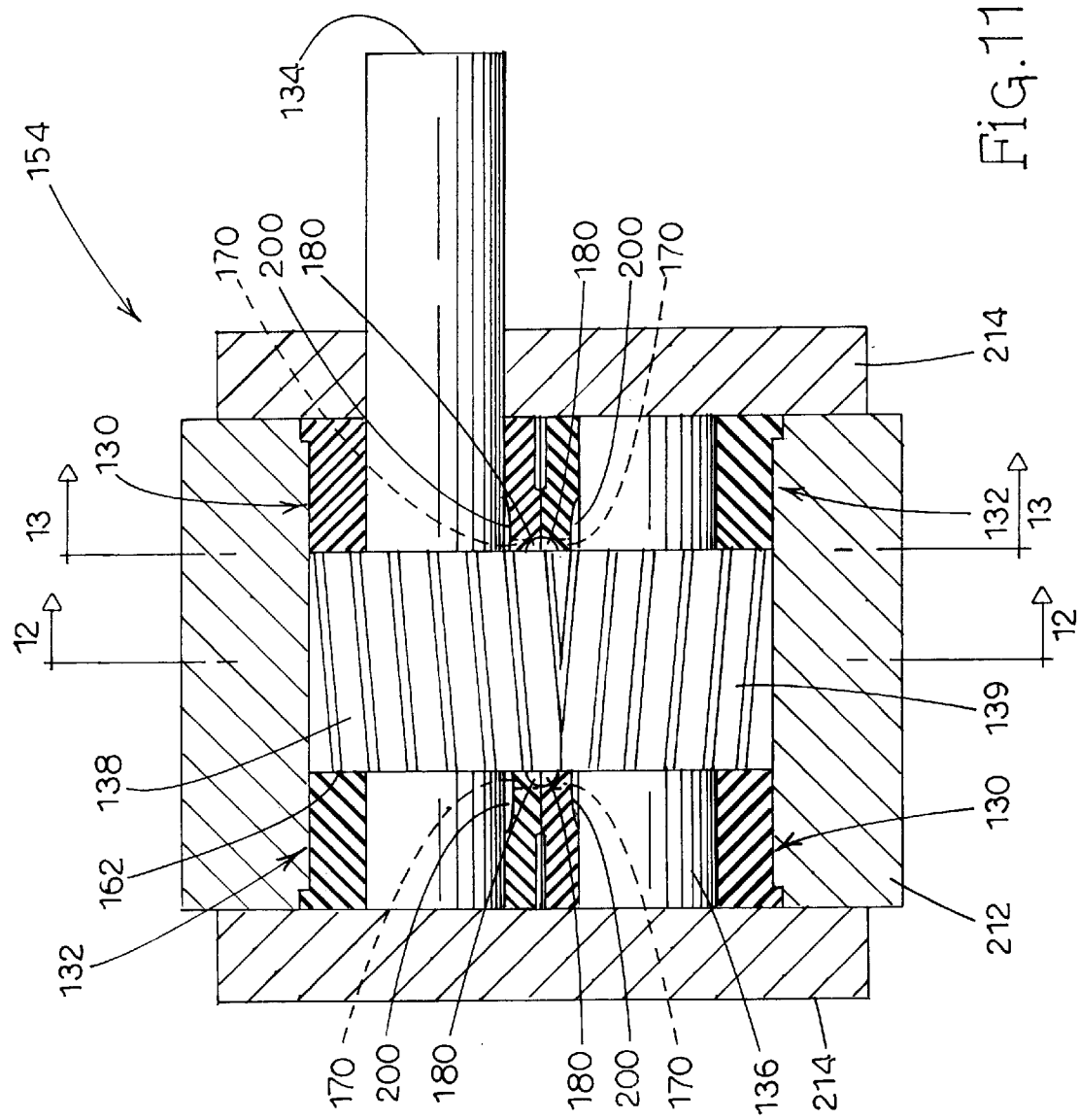
FIG. 11 is a partial cutaway side elevation view of a gear pump according to the present invention.
Figure 12:
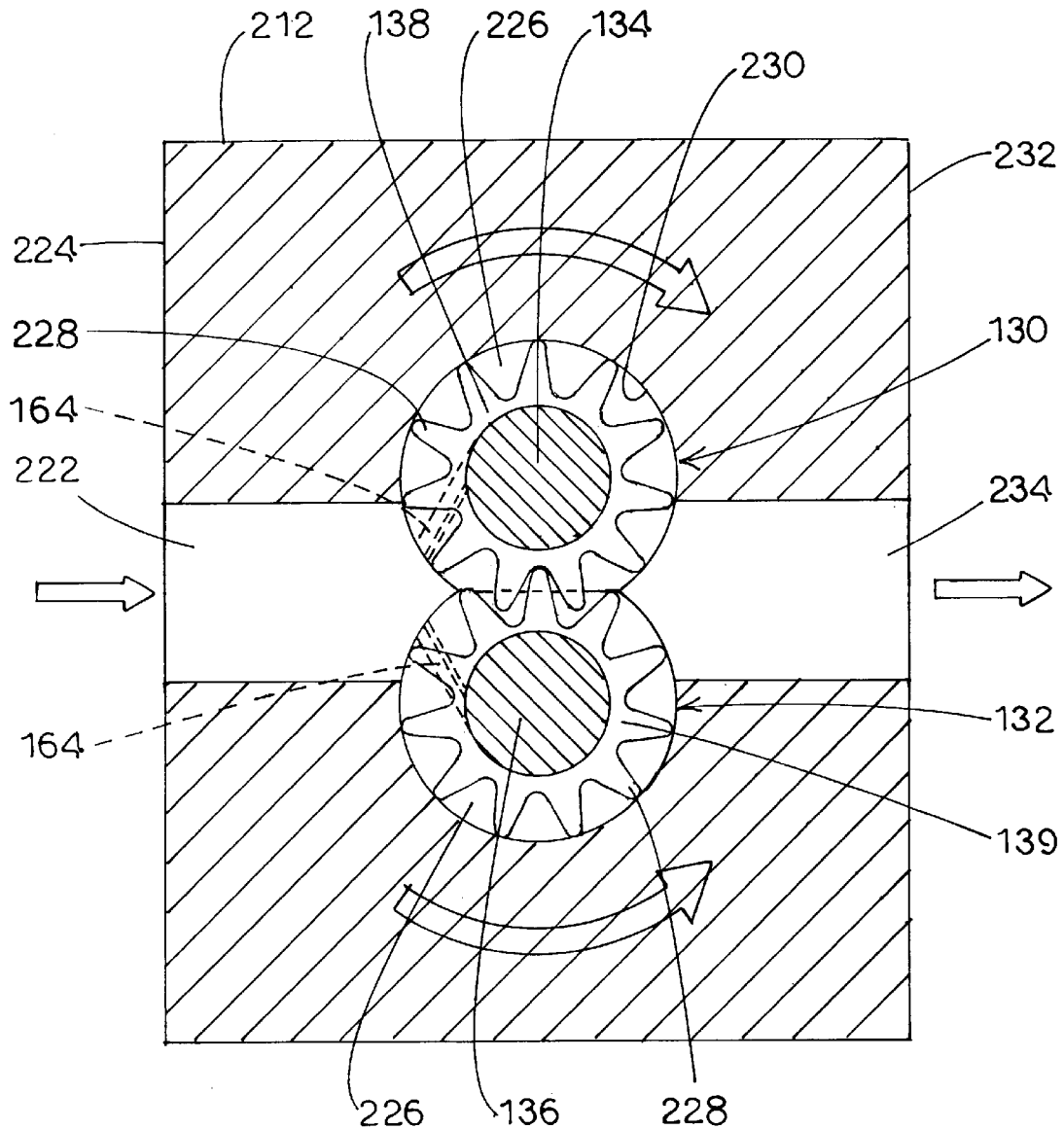
FIG. 12 is a vertical cross-sectional view of the gear pump in FIG. 11 taken along line 12—12.

The operation of bearings 130, 132 within gear pump 154 will now be described with particular reference to FIGS. 11–15. As shafts 134, 136 of gear pump 154 rotate, a material such as polymer melt is drawn into inlet 222 of suction side 224 of gear pump 154 and is carried by spaces 226 defined between teeth 228 of gears 138, 139 and pump cavity 230 to discharge side 232. Enlarged pressure relief recess 194 produces a pressure differential such that a portion of the polymer melt will be diverted into feed channels 170 instead of being discharged through outlet 234 of gear pump 154. Rounded corners 190 and sloping junctions 192 (see FIG. 9), and the acute angle of feed channels 170 with respect to plane 156, all serve to create an improved, more direct lubrication pathway into the journal spaces of bearings 130, 132. Referring to FIGS. 7, 8 and 11, the diverted portion of the polymer melt flows through feed channels 170 into pockets 200. The helical contour and smoothness of peripheral edge 204 of each pocket 200, as well as the greater width of each pocket 200 with respect to its depth, results in a more even and complete distribution of the polymer melt across inner surface 146 of bearing 130, 132 and reduces shearing in the polymer melt. Additionally, wiper groove 164 on each bearing 130, 132 assists in distributing polymer melt through the clearance space between inside lateral face 162 and adjacent gear 138, 139.

It will be understood that various details or features of the invention may be changed without departing from the scope of the invention. Furthermore, the foregoing description is for the purpose of illustration only, and not for the purpose of limitation—the invention being defined by the claims.

What is claimed is:

1. A journal bearing comprising:
   (a) a body having a central longitudinal axis, a cylindrical inner surface coaxially disposed around the longitudinal axis and defining an axial bore, and an outer surface including a peripheral planar section;
   (b) a lateral face disposed on an end of the body and extending between the outer surface and the inner surface perpendicularly with respect to the planar section of the body;
   (c) a feed channel formed in the lateral face at an oblique angle with respect to the planar section and in an inward direction with respect to the axial bore, the feed channel having first and second ends, the first end of the feed channel communicating with the outer surface at a location proximate to the planar section, and the second end of the feed channel communicating with the axial bore; and
   (d) a pocket formed in the inner surface in communication with the second end of the feed channel and extending along a substantially helical path from the lateral face, wherein at least a portion of the pocket has a width of greater magnitude than a corresponding depth of the portion.

2. The bearing according to claim 1 wherein the outer surface is D-shaped.

3. The bearing according to claim 1 further comprising a groove formed on the lateral face and extending tangentially from the axial bore.

4. The bearing according to claim 1 wherein the body includes a flange.

5. The bearing according to claim 1 wherein the feed channel has a substantially rectangular cross-section.

6. The bearing according to claim 1 wherein the feed channel has a rounded cross-section.

7. The bearing according to claim 1 further comprising a chamfered section formed on the lateral face and extending to an edge defined between the lateral face and the outer surface of the body.

8. The bearing according to claim 1 wherein the pocket is defined by a smooth peripheral edge disposed on the inner surface of the body, the peripheral edge having first and second sides, the first and second sides beginning at an inlet of the pocket in communication with the feed channel and terminating at an apex of the pocket on the inner surface.

9. The bearing according to claim 8 wherein the pocket has a width defined between the first and second sides of the peripheral edge, the width is constant along a first portion of the pocket, and the width decreases along a second portion of the pocket terminating at the apex of the pocket.

10. The bearing according to claim 8 wherein a depth of the pocket gradually increases from the peripheral edge.

11. A journal bearing comprising:
   (a) a body having a central longitudinal axis, a cylindrical inner surface coaxially disposed around the longitudinal axis and defining an axial bore, and an outer surface including a peripheral flat section;
   (b) a lateral face disposed on an end of the body and extending between the outer surface and the inner surface perpendicularly with respect to the flat section of the body;
   (c) a feed channel formed in the lateral face at an oblique angle with respect to the flat section and in an inward direction with respect to the axial bore, the feed channel having an entrance end and an exit end, the entrance end communicating with the outer surface at a location proximate to the flat section and the exit end communicating with the axial bore;
   (d) a recess formed in a boundary defined between the outer surface and the lateral face and having a first edge disposed on the outer surface and a second edge disposed on the lateral face, wherein the second edge of the recess and an edge of the feed channel cooperatively meet at a corner edge on the lateral face; and
   (e) a pocket formed in the inner surface in communication with the exit end of the feed channel and extending along a substantially helical path from the lateral face.

12. The bearing according to claim 11 wherein the first edge of the recess is disposed on the flat section of the outer surface.

13. The bearing according to claim 11 wherein the first edge includes an arcuate section.

14. The bearing according to claim 11 wherein the second edge includes an arcuate section.

15. The bearing according to claim 11 wherein the corner edge is rounded.

16. The bearing according to claim 11 wherein a junction edge slopes downwardly from the lateral face at the corner edge into the body between the recess and the feed channel.

17. A bearing member including inner and outer surfaces and adapted for insertion onto a shaft adjacent to a gear member and for lubricating an annular clearance space defined between the inner surface of the bearing member and an outer surface of the shaft comprising:
   (a) a bearing member body defined by the inner and outer surfaces, wherein the inner surface defines an axial bore along a longitudinal axis, and the outer surface is radially spaced from the inner surface and includes a flat portion;
   (b) a radial face disposed on a side of the bearing member in perpendicular relation to the flat portion of the outer surface and facing a side of the gear member;
   (c) means disposed on the radial face for providing a feed path from a first location proximate to the outer surface of the bearing member to a second location proximate to the inner surface of the bearing member, wherein the feed path is disposed at an oblique angle with respect to the flat portion of the outer surface; and
   (d) means disposed on the inner surface of the bearing member for providing a substantially helical path from the second location to an interior location on the inner surface and for receiving a fluid flowing from the feed path providing means, wherein the substantially helical path and the shaft both have a generally similar rotational orientation.

18. A gear pump comprising:
   (a) a rotatable first shaft including a first gear disposed within a chamber;
   (b) a first bearing means including coaxial inner and outer surfaces and disposed on the first shaft, the first bearing means including a radial face extending between the inner and outer surfaces and disposed adjacent to the first gear, wherein the inner surface and the first shaft define a first annular clearance space, and wherein the outer surface includes a first flat section spaced radially from the first shaft in perpendicular relation to the radial face;

(c) means disposed on the radial face for providing a feed path from a first location proximate to the outer surface to a second location proximate to the first annular clearance space, wherein the feed path is disposed at an oblique angle with respect to the first flat section of the outer surface; and (d) means disposed on the inner surface of the first bearing means for providing a substantially helical path from the second location to an interior location on the inner surface and for receiving a fluid flowing from the feed path providing means, wherein the substantially helical path arid the first shaft both have a generally similar rotational orientation, arid wherein rotation of the first shaft permits the fluid received in the substantially helical path to be distributed throughout the first annular clearance space.

19. The gear pump according to claim 18 wherein the first bearing means includes a body having an outer periphery defined by the outer surface and a cylindrical bore defined by the inner surface.

20. The gear pump according to claim 18 wherein the feed path providing means includes a channel formed in the radial face of the first bearing means, the channel having an inlet end communicating with the outer surface of the first bearing means and an outlet end communicating with the inner surface of the first bearing means.

21. The gear pump according to claim 18 wherein the substantially helical path providing means includes a puddle formed in the inner surface of the first bearing means in communication with the second location of the feed path providing means and disposed along the helical path.

22. The gear pump according to claim 21 wherein a major portion of the puddle along the helical path has a width of greater magnitude than a corresponding depth of the major portion.

23. The gear pump according to claim 18 further comprising a recess disposed in communication with the feed path providing means and formed in a boundary defined between the first flat section of the outer surface of the first bearing means and the radial face of the first bearing means.

24. The gear pump according to claim 18 further comprising:

(a) a second shaft disposed in parallel relation to the first shaft and including a second gear disposed within the chamber in meshing engagement with the first gear of the first shaft;

(b) a second bearing means including inner and outer surfaces and disposed on the second shaft, the second bearing means including a radial face extending between the inner and outer surfaces of the second bearing means and disposed adjacent to the second gear, wherein the inner surface of the second bearing means and the second shaft define a second annular clearance space, the outer surface of the second bearing means includes a second flat section disposed adjacent to the first flat section of the first bearing means, and the second bearing means is disposed in opposing symmetrical relation to the first bearing means with respect to a plane defined between the first and second flat sections;

(c) means disposed on the radial face of the second bearing means for providing a feed path from a first location proximate to the outer surface of the second bearing means to a second location proximate to the second annular clearance space, wherein the feed path is disposed at an acute angle with respect to the second flat section of the outer surface of the second bearing means; and (d) means disposed on the inner surface of the second bearing means for providing a substantially helical path from the second location to an interior location on the inner surface of the second bearing means and for receiving a fluid flowing from the feed path providing means, wherein rotation of the second shaft permits the fluid received in the substantially helical path to be distributed throughout the second annular clearance space.

25. A method for lubricating a first shaft of a gear pump comprising the steps of:

(a) providing a bearing including a body having a central longitudinal axis, a cylindrical inner surface coaxially disposed around the longitudinal axis and defining an axial bore, an outer surface including a peripheral planar section, and a lateral face disposed on an end of the body and extending between the outer surface and the inner surface in perpendicular relation to the planar section;

(b) forming a feed channel in the lateral face of the bearing at an oblique angle with respect to the planar section and inwardly directed toward the axial bore from a discharge side of the gear pump;

(c) forming a pocket in the inner surface of the bearing in fluid communication with the feed channel, wherein the pocket extends from the lateral face of the bearing into the axial bore along a substantially helical path, and the substantially helical path and the shaft both have a generally similar rotational orientation;

(d) rotatably supporting a portion of the first shaft in the bearing by extending the shaft through the axial bore of the bearing, wherein the lateral face of the bearing is adjacent to a gear disposed on the first shaft;

(e) placing the gear of the first shaft in rotatable meshing engagement with a gear of a second shaft;

(f) diverting a portion of fluid flowing in the gear pump on the discharge side into the feed channel; and (g) forcing the diverted fluid from the feed channel into the pocket to evenly distribute the diverted fluid throughout the axial bore between the inner surface of the bearing and the first shaft.

26. A journal bearing comprising:

(a) a body having a central longitudinal axis, a cylindrical inner surface coaxially disposed around the longitudinal axis and defining an axial bore, and an outer surface including a peripheral planar section;

(b) a lateral face disposed on an end of the body and extending between the outer surface and the inner surface;

(c) a feed channel formed in the lateral face at an oblique angle with respect to the planar section and in an inward direction with respect to the axial bore, the feed channel having a substantially rectangular cross-section and first and second ends, the first end of the feed channel communicating with the outer surface at a location proximate to the planar section, and the second end of the feed channel communicating with the axial bore; and (d) a pocket formed in the inner surface in communication with the second end of the feed channel and extending along a substantially helical path from the lateral face, wherein at least a portion of the pocket has a width of greater magnitude than a corresponding depth of the portion.

27. A journal bearing comprising:
(a) a body having a central longitudinal axis, a cylindrical inner surface coaxially disposed around the longitudinal axis and defining an axial bore, and an outer surface including a peripheral planar section;
(b) a lateral face disposed on an end of the body and extending between the outer surface and the inner surface, the lateral face including a chamfered section formed thereon and extending to an edge defined between the lateral face and the outer surface of the body;
(c) a feed channel formed in the lateral face at an oblique angle with respect to the planar section and in an inward direction with respect to the axial bore, the feed channel having first and second ends, the first end of the feed channel communicating with the outer surface at a location proximate to the planar section, and the second end of the feed channel communicating with the axial bore; and
(d) a pocket formed in the inner surface in communication with the second end of the feed channel and extending along a substantially helical path from the lateral face, wherein at least a portion of the pocket has a width of greater magnitude than a corresponding depth of the portion.

28. A journal bearing comprising:
(a) a body having a central longitudinal axis, a cylindrical inner surface coaxially disposed around the longitudinal axis and defining an axial bore, and an outer surface including a peripheral planar section;
(b) a lateral face disposed on an end of the body and extending between the outer surface and the inner surface;
(c) a feed channel formed in the lateral face at an oblique angle with respect to the planar section and in an inward direction with respect to the axial bore, the feed channel having first and second ends, the first end of the feed channel communicating with the outer surface at a location proximate to the planar section, and the second end of the feed channel communicating with the axial bore; and
(d) a pocket formed in the inner surface in communication with the second end of the feed channel and extending along a substantially helical path from the lateral face, wherein at least a portion of the pocket has a width of greater magnitude than a corresponding depth of the portion, and wherein the pocket is defined by a smooth peripheral edge disposed on the inner surface of the body, the peripheral edge having first and second sides, the first and second sides beginning at an inlet of the pocket in communication with the feed channel and terminating at an apex of the pocket on the inner surface.

29. The bearing according to claim 28 wherein the pocket has a width defined between the first and second sides of the peripheral edge, the width is constant along a first portion of the pocket, and the width decreases along a second portion of the pocket terminating at the apex of the pocket.

30. The bearing according to claim 28 wherein a depth of the pocket gradually increases from the peripheral edge.

31. A journal bearing comprising:
(a) a body having a central longitudinal axis, a cylindrical inner surface coaxially disposed around the longitudinal axis and defining an axial bore, and an outer surface including a peripheral flat section;
(b) a lateral face disposed on an end of the body and extending between the outer surface and the inner surface;
(c) a feed channel formed in the lateral face at an oblique angle with respect to the flat section and in an inward direction with respect to the axial bore, the feed channel having an entrance end and an exit end, the entrance end communicating with the outer surface at a location proximate to the flat section and the exit end communicating with the axial bore;
(d) a recess formed in a boundary defined between the outer surface and the lateral face, the recess having first and second edges, the first edge disposed on the outer surface and including an arcuate section, and the second edge disposed on the lateral face, wherein the second edge of the recess and an edge of the feed channel cooperatively meet at a corner edge on the lateral face; and
(e) a pocket formed in the inner surface in communication with the exit end of the feed channel and extending along a substantially helical path from the lateral face.

32. A journal bearing comprising:
(a) a body having a central longitudinal axis, a cylindrical inner surface coaxially disposed around the longitudinal axis and defining an axial bore, and an outer surface including a peripheral flat section;
(b) a lateral face disposed on an end of the body and extending between the outer surface and the inner surface;
(c) a feed channel formed in the lateral face at an oblique angle with respect to the flat section and in an inward direction with respect to the axial bore, the feed channel having an entrance end and an exit end, the entrance end communicating with the outer surface at a location proximate to the flat section and the exit end communicating with the axial bore;
(d) a recess formed in a boundary defined between the outer surface and the lateral face, the recess having first and second edges, the first edge disposed on the outer surface, and the second edge disposed on the lateral face and having an arcuate section, wherein the second edge of the recess and an edge of the feed channel cooperatively meet at a corner edge on the lateral face; and
(e) a pocket formed in the inner surface in communication with the exit end of the feed channel and extending along a substantially helical path from the lateral face.

33. A journal bearing comprising:
(a) a body having a central longitudinal axis, a cylindrical inner surface coaxially disposed around the longitudinal axis and defining an axial bore, and an outer surface including a peripheral flat section;
(b) a lateral face disposed on an end of the body and extending between the outer surface and the inner surface;
(c) a feed channel formed in the lateral face at an oblique angle with respect to the flat section and in an inward direction with respect to the axial bore, the feed channel having an entrance end and an exit end, the entrance end communicating with the outer surface at a location proximate to the flat section and the exit end communicating with the axial bore;
(d) a recess formed in a boundary defined between the outer surface and the lateral face and having a first edge disposed on the outer surface and a second edge disposed on the lateral face, wherein the second edge of the recess and an edge of the feed channel cooperatively meet at a rounded corner edge on the lateral face; and (e) a pocket formed in the inner surface in communication with the exit end of the feed channel and extending along a substantially helical path from the lateral face.

34. A journal bearing comprising:
(a) a body having a central longitudinal axis, a cylindrical inner surface coaxially disposed around the longitudinal axis and defining an axial bore, and an outer surface terminating at an outer surface lateral edge and including a peripheral flat section, the flat section extending from the outer surface lateral edge along the axial length of the body and disposed at a radial distance from the central longitudinal axis;
(b) a lateral face disposed on an end of the body and extending between the outer surface lateral edge and the inner surface;
(c) a feed channel formed in the lateral face at an oblique angle with respect to the flat section and in an inward direction with respect to the axial bore, the feed channel having an entrance end and an exit end, the entrance end communicating with the outer surface at a location proximate to the flat section and the exit end communicating with the axial bore;
(d) a recess formed in a boundary defined between the outer surface and the lateral face and having a first edge disposed on the outer surface and a second edge disposed on the lateral face, wherein the second edge of the recess and an edge of the feed channel cooperatively meet at a corner edge on the lateral face; and
(e) a pocket formed in the inner surface in communication with the exit end of the feed channel and extending along a substantially helical path from the lateral face.

35. A journal bearing comprising:
(a) a body having a central longitudinal axis, a cylindrical inner surface coaxially disposed around the longitudinal axis and defining an axial bore, and an outer surface terminating at an outer surface lateral edge and including a peripheral flat section, the flat section extending form the outer surface lateral edge along the axial length of the body and disposed at a radial distance from the central longitudinal axis;
(b) a lateral face disposed on an end of the body and extending between the outer surface lateral edge and the inner surface generally perpendicularly with respect to the flat section of the outer surface;
(c) a feed channel formed in the lateral face and having an entrance end and an exit end, the entrance end communicating with the outer surface at a location proximate to the flat section and the exit end communicating with the axial bore;
(d) a recess formed in the body generally along a portion of outer surface lateral edge, the recess having a first recess edge disposed on the outer surface, a second recess edge disposed on the lateral face, a generally smooth corner edge disposed on the lateral face, and a generally smooth junction edge, wherein the first recess edge includes a first arcuate section and the second recess edge includes a second arcuate section, the first arcuate section meets the second arcuate section at the outer surface lateral edge, the corner edge defines a transition between the second recess edge and a first edge of the feed channel, and the junction edge extends between the corner edge and the outer surface; and
(e) a puddle formed in the inner surface in communication with the exit end of the feed channel and defined by a smooth peripheral edge disposed on the inner surface.

36. The bearing according to claim 35 wherein the pocket extends along a substantially helical path from the lateral face.

37. The bearing according to claim 35 wherein the peripheral edge of the pocket includes first and second sides beginning at an inlet of the pocket in communication with the feed channel and terminating at an apex of the pocket on the inner surface of the body.

38. The bearing according to claim 35 wherein the junction edge slopes downwardly into the body along an arcuate path from the corner edge toward the outer surface.

39. The bearing according to claim 35 wherein the junction edge at least partially defines the first edge of the feed channel.

40. The bearing according to claim 35 wherein the first recess edge is disposed on the flat section of the outer surface.

* * * * *